United States Patent
Zhou et al.

(10) Patent No.: US 11,589,382 B2
(45) Date of Patent: Feb. 21, 2023

(54) DEFAULT TRANSMISSION BEAMS FOR MULTIPLE TRANSMISSION-RECEPTION POINTS IN WIRELESS COMMUNICATIONS

(71) Applicant: QUALCOMM Incorporated, San Diego, CA (US)

(72) Inventors: Yan Zhou, San Diego, CA (US); Xiaoxia Zhang, San Diego, CA (US); Mostafa Khoshnevisan, San Diego, CA (US); Jing Sun, San Diego, CA (US); Tao Luo, San Diego, CA (US); Peter Gaal, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/066,066

(22) Filed: Oct. 8, 2020

(65) Prior Publication Data
US 2021/0112561 A1   Apr. 15, 2021

Related U.S. Application Data

(60) Provisional application No. 62/914,330, filed on Oct. 11, 2019.

(51) Int. Cl.
*H04W 72/04* (2009.01)
*H04W 72/53* (2023.01)
(Continued)

(52) U.S. Cl.
CPC ........... *H04W 72/53* (2023.01); *H04W 24/08* (2013.01); *H04W 72/046* (2013.01);
(Continued)

(58) Field of Classification Search
CPC ............ H04W 72/0493; H04W 24/08; H04W 72/042; H04W 72/0446; H04W 72/046;
(Continued)

(56) References Cited

U.S. PATENT DOCUMENTS

2010/0315949 A1* 12/2010 Agarwal ............... H04W 24/08
370/252
2018/0227887 A1*  8/2018 Hakola .................. H04B 7/022
(Continued)

OTHER PUBLICATIONS

Enhancement on multi-TRP/panel transmission Chongging, China, Oct. 14 -20, 2019 (Year: 2019).*
(Continued)

*Primary Examiner* — Mewale A Ambaye
(74) *Attorney, Agent, or Firm* — Holland & Hart LLP

(57) ABSTRACT

Methods, systems, and devices for wireless communications are described for concurrent communications between multiple transmission-reception points (TRPs) and a user equipment (UE). A default beam for each of the TRPs may be determined, and in the case that the default beams are unable to be concurrently received at the UE, a prioritization rule may be applied to determine which TRP uses the initially determined default beam, where the other TRP(s) may use a different beam. A UE also may be configured with a subset of control resource sets for each TRP, such that beams associated with different configured subsets are compatible and able to be concurrently received at the UE. Other techniques for providing compatibility between beams of multiple concurrent TRP transmissions include determination of a first beam, and selection of a second beam based on a mapping to the first beam, or explicit configuration by a base station.

42 Claims, 20 Drawing Sheets

(51) Int. Cl.
H04W 72/044 (2023.01)
H04W 72/1263 (2023.01)
H04W 24/08 (2009.01)
H04W 72/0446 (2023.01)
H04W 80/02 (2009.01)
H04W 72/23 (2023.01)
H04W 72/56 (2023.01)

(52) U.S. Cl.
CPC ............... H04W 72/0446 (2013.01); H04W 72/1263 (2013.01); H04W 72/23 (2023.01); H04W 72/56 (2023.01); H04W 80/02 (2013.01)

(58) Field of Classification Search
CPC ............. H04W 72/10; H04W 72/1263; H04W 80/02; H04W 72/06; H04W 16/28; H04W 72/0453
See application file for complete search history.

(56) References Cited

U.S. PATENT DOCUMENTS

| | | | | |
|---|---|---|---|---|
| 2018/0278402 | A1* | 9/2018 | Zeng | H04W 72/0446 |
| 2018/0368133 | A1* | 12/2018 | Park | H04L 5/00 |
| 2019/0181932 | A1* | 6/2019 | Jayawardene | H04B 7/063 |
| 2019/0181941 | A1* | 6/2019 | Kim | H04W 72/046 |
| 2021/0112561 | A1* | 4/2021 | Zhou | H04W 72/1263 |

OTHER PUBLICATIONS

Additional considerations on beam management for multi-TRP Taipei, Jan. 21-25, 2019 (Year: 2019).*
Enhancement on multiple panel transmission Prague, CZ, Aug. 26-30, 2019 (Year: 2019).*
ASUSTEK: "Enhancements on Multiple TRP or Panel Transmission", 3GPP Draft, R1-1909383, 3GPP TSG RAN WG1 #98, Enhancements on Multiple TRP or Panel Transmission, 3rd Generation Partnership Project (3GPP), Mobile Competence Centre, 650, Route Des Lucioles, F-06921 Sophia-Antipolis Cede, vol. RAN WG1, No. Prague, CZ, Aug. 26, 2019-Aug. 30, 2019, Aug. 16, 2019 (Aug. 16, 2019), XP051765990, 4 Pages, Retrieved from the Internet: URL:http://www.3gpp.org/ftp/tsg_ran/WG1_RL1/TSGR1_98/Docs/R1-1909383.zip [retrieved on Aug. 16, 2019] pp. 2, 3.
International Search Report and Written Opinion—PCT/US2020/055002—ISA/EPO—dated Apr. 14, 2021
LG Electronics: Enhancements on Multi-TRP/Panel Transmission, 3GPP Draft, R1-1910582, 3GPP TSG RAN WG1 Meeting #98bis, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808599, 23 Pages, Retrieved from the Internet: URL:https://ftp.3gpp.org/tsg_ran/WG1_RL1/TSGR1_98b/Docs/R1-1910582.zip [retrieved on Oct. 5, 2019] p. 17.
OPPO: "Enhancements on Multi-TRP and Multi-Panel Transmission", 3GPP Draft, R1-1904036, 3GPP TSG RAN WG1 Meeting #96bis, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699440, 10 Pages, Retrieved from the Internet: URL:http://www.3gpp.org/ftp/Meetings%5F3GPP%5FSYNC/RAN1/Docs/R1%2D1904036%2Ezip [retrieved on Apr. 7, 2019] Proposal 6-7, p. 5.
Partial International Search Report—PCT/US2020/055002—ISA/EPO—dated Dec. 9, 2020.
ZTE: "Additional Considerations on Beam Management for multi-TRP", 3GPP Draft, R1-1900092, 3GPP TSG RAN WG1 Ad-Hoc Meeting 1901, Additional Considerations on Beam Management for Multi-TRP, 3rd Generation Partnership Project (3GPP), Mobile Competence Centre, 650, Route Des Lucioles, F-06921 Sophia-Antipo, vol. RAN WG1. No. Taipei, Jan. 21, 2019-Jan. 25, 2019, Jan. 20, 2019 (Jan. 20, 2019), XP051593818, 6 Pages, Retrieved from the Internet: URL:http://www.3gpp.org/ftp/Meetings%5F3GPP%5FSYNC/RAN1/Docs/R1%2D1900092%2Ezip [retrieved on Jan. 20, 2019] p. 3, figure 4, p. 2, figure 1.

* cited by examiner

DEFAULT TRANSMISSION BEAMS FOR MULTIPLE TRANSMISSION-RECEPTION POINTS IN WIRELESS COMMUNICATIONS

CROSS REFERENCE

The present application for patent claims the benefit of U.S. Provisional Patent Application No. 62/914,330 by ZHOU et al., entitled "DEFAULT TRANSMISSION BEAMS FOR MULTIPLE TRANSMISSION-RECEPTION POINTS IN WIRELESS COMMUNICATIONS," filed Oct. 11, 2019, assigned to the assignee hereof, and expressly incorporated by reference herein.

BACKGROUND

The following relates generally to wireless communications, and more specifically to default transmission beams for multiple transmission-reception points in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments a base station, such as a next generation or giga nodeB (gNB), may support communications using one or more transmission reception points (TRPs) to improve reliability, coverage, capacity performance, or combinations thereof. In some cases, a UE may establish beamformed communications links with multiple TRPs to simultaneously receive and transmit communications with the multiple TRPs. For example, a UE may receive a physical downlink control channel (PDCCH), decode control information from the PDCCH and decode a subsequent physical downlink shared channel (PDSCH) transmission using the decoded control information. In some cases, the PDCCH transmission and the PDSCH transmissions may be scheduled close together and the UE may not be able to decode the PDCCH transmission prior to the PDSCH transmission (e.g., if the time between the transmissions is below a threshold). Efficient and reliable techniques to receive transmission from multiple TRPs concurrently in such cases are thus desirable.

SUMMARY

The described techniques relate to improved methods, systems, devices, and apparatuses that support default transmission beams for multiple transmission-reception points in wireless communications. According to various aspects, techniques are described that provide for determination of default beams of two or more transmission-reception points (TRPs) for downlink communications that are concurrently received at a user equipment (UE). In some cases, a TRP may use a default beam for a downlink shared channel transmission (e.g., a physical downlink shared channel (PDSCH) transmission), and a UE may use the default beam to monitor for the downlink shared channel transmission that is transmitted within a time threshold of an associated control channel transmission (e.g., a physical downlink control channel (PDCCH) transmission). In some cases, in order to allow a UE to concurrently receive multiple transmissions from different TRPs via associated default beams, the default beams may be configured such that the UE is able to receive each default beam concurrently.

In some cases, a default beam for each of multiple TRPs may be determined, and in the case that the default beams are not compatible (i.e., are unable to be concurrently received at the UE), the UE and TRP may apply a prioritization rule to determine which TRP uses the initially determined default beam, where the other TRP(s) may use a different beam than the initially determined default beam associated with that TRP. Such a prioritization rule may be a preconfigured rule, may be signaled by a serving base station (e.g., via radio resource control (RRC) signaling, a medium access control (MAC) control element (CE), downlink control information (DCI), or any combinations thereof). In other cases, a UE may be configured with a subset of CORESETs for each TRP, such that beams associated with different configured subsets are compatible and able to be concurrently received at the UE. In further cases, a first beam for a first TRP may be determined based on a lowest control resource set (CORESET) ID of the first TRP, and then a second beam for a second TRP may be determined based on a mapping to the first beam. In still further cases, a serving base station may explicitly configure default beams for one or more TRPs so as to provide compatible default beams for each TRP.

A method of wireless communication at a UE is described. The method may include identifying a first default beam for receiving downlink transmissions from a first transmission-reception point and a second default beam for receiving downlink transmissions from a second transmission-reception point, determining that the first default beam and the second default beam are incapable of concurrent reception at the UE, selecting, responsive to the determining and based at least in part on a predetermined prioritization rule, one of the first and second default beams, and receiving downlink communications from the transmission-reception point associated with the selected default beam.

An apparatus for wireless communication at a UE is described. The apparatus may include a processor, memory coupled with the processor, and instructions stored in the memory. The instructions may be executable by the processor to cause the apparatus to identify a first default beam for receiving downlink transmissions from a first transmission-reception point and a second default beam for receiving downlink transmissions from a second transmission-reception point, determine that the first default beam and the second default beam are incapable of concurrent reception at the UE, select, responsive to the determining and based at least in part on a predetermined prioritization rule, one of the first and second default beams, and receive downlink communications from the transmission-reception point associated with the selected default beam.

Another apparatus for wireless communication at a UE is described. The apparatus may include means for identifying a first default beam for receiving downlink transmissions from a first transmission-reception point and a second default beam for receiving downlink transmissions from a second transmission-reception point, determining that the first default beam and the second default beam are incapable of concurrent reception at the UE, selecting, responsive to the determining and based at least in part on a predetermined prioritization rule, one of the first and second default beams, and receiving downlink communications from the transmission-reception point associated with the selected default beam.

A non-transitory computer-readable medium storing code for wireless communication at a UE is described. The code may include instructions executable by a processor to identify a first default beam for receiving downlink transmissions from a first transmission-reception point and a second default beam for receiving downlink transmissions from a second transmission-reception point, determine that the first default beam and the second default beam are incapable of concurrent reception at the UE, select, responsive to the determining and based at least in part on a predetermined prioritization rule, one of the first and second default beams, and receive downlink communications from the transmission-reception point associated with the selected default beam.

Some examples of the method, apparatuses, and non-transitory computer-readable medium described herein may further include operations, features, means, or instructions for determining that the first transmission-reception point is associated with a first control resource set group and the second transmission-reception point is associated with a second control resource set group, where the first control resource set group is associated with the first default beam and the second control resource set group is associated with the second default beam, and where the predetermined prioritization rule indicates which of the first control resource set group or the second control resource set group may have a higher priority. In some examples of the method, apparatuses, and non-transitory computer-readable medium described herein, the predetermined prioritization rule indicates a prespecified priority of the first control resource set group and the second control resource set group.

Some examples of the method, apparatuses, and non-transitory computer-readable medium described herein may further include operations, features, means, or instructions for receiving an indication from a base station that indicates which of the first control resource set group or the second control resource set group may have a higher priority. In some examples of the method, apparatuses, and non-transitory computer-readable medium described herein, the indication from the base station is provided in a radio resource control transmission, a medium access control (MAC) control element, in downlink control information, or any combinations thereof.

Some examples of the method, apparatuses, and non-transitory computer-readable medium described herein may further include operations, features, means, or instructions for determining one or more parameters of each of the first control resource set group and the second control resource set group, where the predetermined prioritization rule is based on the determined one or more parameters. In some examples of the method, apparatuses, and non-transitory computer-readable medium described herein, the one or more parameters include one or more of a number of control resource sets in each of the first control resource set group and the second control resource set group, a search space monitoring period of each of the first control resource set group and the second control resource set group, or any combinations thereof.

In some examples of the method, apparatuses, and non-transitory computer-readable medium described herein, the predetermined prioritization rule indicates a transmission-reception point associated with a handover operation may have priority over other transmission-reception points.

In some examples of the method, apparatuses, and non-transitory computer-readable medium described herein, the predetermined prioritization rule provides that priorities for different transmission-reception points can change based on one or more parameters. In some examples of the method, apparatuses, and non-transitory computer-readable medium described herein, the one or more parameters include transmission slots, and where the first default beam for the first transmission-reception point is selected for a first subset of transmission slots, and the second default beam for the second transmission-reception point is selected for a second subset of transmission slots. In some examples of the method, apparatuses, and non-transitory computer-readable medium described herein, the one or more parameters include a value of a control resource set identification associated with each of the first transmission-reception point and the second transmission-reception point, and where a lowest valued control resource set identification may have a highest priority and the associated default transmission beam is selected for communications with the associated transmission-reception point.

Some examples of the method, apparatuses, and non-transitory computer-readable medium described herein may further include operations, features, means, or instructions for transmitting, to a serving base station, an incompatible beam report that indicates beams that are not able to be concurrently received at the UE.

A method of wireless communication at a UE is described. The method may include identifying a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points, determining a first default beam for the first transmission-reception point, selecting a second default beam for the second transmission-reception point based on the mapping, and receiving concurrent downlink communications from the first transmission-reception point using the first default beam and from the second transmission-reception point using the second default beam.

An apparatus for wireless communication at a UE is described. The apparatus may include a processor, memory coupled with the processor, and instructions stored in the memory. The instructions may be executable by the processor to cause the apparatus to identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points, determine a first default beam for the first transmission-reception point, select the second default beam for the second transmission-reception point based on the mapping, a receive concurrent downlink communications from the first transmission-reception point using the first default beam and from the second transmission-reception point using the second default beam.

Another apparatus for wireless communication at a UE is described. The apparatus may include means for identifying a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points, determining a first default beam for the first transmission-reception point, selecting a second default beam for the second transmission-reception point based on the mapping, and receiving concurrent downlink communications from the first transmission-reception point using the first default beam and from the second transmission-reception point using the second default beam.

A non-transitory computer-readable medium storing code for wireless communication at a UE is described. The code may include instructions executable by a processor to identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points, determine a first default beam for the first transmission-reception point, select a second default beam for the second transmission-reception point based on the mapping, and receive concurrent downlink communications from the first transmission-reception point using the first default beam and from the second transmission-reception point using the second default beam.

In some examples of the method, apparatuses, and non-transitory computer-readable medium described herein, the mapping indicates a first subset of control resource sets for the first transmission-reception point and a second subset of control resource sets for the second transmission-reception point, each control resource set having an associated default beam and where the first subset of control resource sets and the second subset of control resource sets are non-overlapping, and the first default beam is determined based on the first subset of control resource sets and the second default beam is determined based on the second subset of control resource sets. Some examples of the method, apparatuses, and non-transitory computer-readable medium described herein any default beam associated with the first subset of control resource sets can be concurrently received at the UE with any default beam associated with the second subset of control resource sets.

In some examples of the method, apparatuses, and non-transitory computer-readable medium described herein, the first default beam for the first transmission-reception point is determined based on control resources set of a downlink control channel reception at the UE, and the second default beam is mapped to the first default beam.

In some examples of the method, apparatuses, and non-transitory computer-readable medium described herein, the mapping provides that the second default beam does not correspond to any configured control resource set of the first transmission-reception point.

A method of wireless communication at a UE is described. The method may include receiving configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE, identifying that a time offset between a physical downlink control channel transmission and a physical downlink shared channel transmission of each of the first transmission-reception point and the second transmission-reception point is below a threshold, and receiving, based on the identification that the time offset is below the threshold, the first default beam from the first transmission-reception point concurrently with the second default beam from the second transmission-reception point.

An apparatus for wireless communication at a UE is described. The apparatus may include a processor, memory coupled with the processor, and instructions stored in the memory. The instructions may be executable by the processor to cause the apparatus to receive configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE, identify that a time offset between a physical downlink control channel transmission and a physical downlink shared channel transmission of each of the first transmission-reception point and the second transmission-reception point is below a threshold, and receive, based on the identification that the time offset is below the threshold, the first default beam from the first transmission-reception point concurrently with the second default beam from the second transmission-reception point.

Another apparatus for wireless communication at a UE is described. The apparatus may include means for receiving configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE, identifying that a time offset between a physical downlink control channel transmission and a physical downlink shared channel transmission of each of the first transmission-reception point and the second transmission-reception point is below a threshold, and receiving, based on the identification that the time offset is below the threshold, the first default beam from the first transmission-reception point concurrently with the second default beam from the second transmission-reception point.

A non-transitory computer-readable medium storing code for wireless communication at a UE is described. The code may include instructions executable by a processor to receive configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE, identify that a time offset between a physical downlink control channel transmission and a physical downlink shared channel transmission of each of the first transmission-reception point and the second transmission-reception point is below a threshold, and receive, based on the identification that the time offset is below the threshold, the first default beam from the first transmission-reception point concurrently with the second default beam from the second transmission-reception point. In some examples of the method, apparatuses, and non-transitory computer-readable medium described herein, the configuration information from the base station is received in a medium access control (MAC) control element (CE). In some examples of the method, apparatuses, and non-transitory computer-readable medium described herein, a same MAC-CE indicates both the first default beam and the second default beam.

In some examples of the method, apparatuses, and non-transitory computer-readable medium described herein, the first default beam is determined based on the associated control transmission beam of the first transmission-reception point, and the second default beam is explicitly indicated in the configuration information.

A method of wireless communication at a base station is described. The method may include identifying a first default beam for transmitting a first downlink communication from a first transmission-reception point to a UE and a second default beam for transmitting a second downlink communication from a second transmission-reception point to the UE, determining that the first default beam and the second default beam are incapable of concurrent reception at the UE, and scheduling, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE.

An apparatus for wireless communication at a base station is described. The apparatus may include a processor, memory coupled with the processor, and instructions stored in the memory. The instructions may be executable by the processor to cause the apparatus to identify a first default beam for transmitting a first downlink communication from a first transmission-reception point to a UE and a second default beam for transmitting a second downlink communication from a second transmission-reception point to the UE, determine that the first default beam and the second default beam are incapable of concurrent reception at the UE, and schedule, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE.

Another apparatus for wireless communication at a base station is described. The apparatus may include means for identifying a first default beam for transmitting a first downlink communication from a first transmission-reception point to a UE and a second default beam for transmitting a second downlink communication from a second transmission-reception point to the UE, determining that the first default beam and the second default beam are incapable of concurrent reception at the UE, and scheduling, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE.

A non-transitory computer-readable medium storing code for wireless communication at a base station is described. The code may include instructions executable by a processor to identify a first default beam for transmitting a first downlink communication from a first transmission-reception point to a UE and a second default beam for transmitting a second downlink communication from a second transmission-reception point to the UE, determine that the first default beam and the second default beam are incapable of concurrent reception at the UE, and schedule, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE.

Some examples of the method, apparatuses, and non-transitory computer-readable medium described herein may further include operations, features, means, or instructions for determining that the first transmission-reception point is associated with a first control resource set group and the second transmission-reception point is associated with a second control resource set group, where the first control resource set group is associated with the first default beam and the second control resource set group is associated with the second default beam, and where the predetermined prioritization rule indicates which of the first control resource set group or the second control resource set group may have a higher priority. In some examples of the method, apparatuses, and non-transitory computer-readable medium described herein, the predetermined prioritization rule indicates a prespecified priority of the first control resource set group and the second control resource set group. Some examples of the method, apparatuses, and non-transitory computer-readable medium described herein may further include operations, features, means, or instructions for transmitting an indication to the UE that indicates which of the first control resource set group or the second control resource set group may have a higher priority.

Some examples of the method, apparatuses, and non-transitory computer-readable medium described herein may further include operations, features, means, or instructions for determining one or more parameters of each of the first control resource set group and the second control resource set group, where the predetermined prioritization rule is based on the determined one or more parameters. In some examples of the method, apparatuses, and non-transitory computer-readable medium described herein, the one or more parameters include one or more of a number of control resource sets in each of the first control resource set group and the second control resource set group, a search space monitoring period of each of the first control resource set group and the second control resource set group, or any combinations thereof.

In some examples of the method, apparatuses, and non-transitory computer-readable medium described herein, the predetermined prioritization rule provides that priorities for different transmission-reception points can change based on one or more parameters. In some examples of the method, apparatuses, and non-transitory computer-readable medium described herein, the one or more parameters include transmission slots, and where the first default beam for the first transmission-reception point is selected for a first subset of transmission slots, and the second default beam for the second transmission-reception point is selected for a second subset of transmission slots. In some examples of the method, apparatuses, and non-transitory computer-readable medium described herein, the one or more parameters include a value of a control resource set identification associated with each of the first transmission-reception point and the second transmission-reception point, and where a lowest valued control resource set identification may have a highest priority and the associated default transmission beam is selected for communications with the associated transmission-reception point.

A method of wireless communication at a base station is described. The method may include identifying a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE, determining a first default beam for the first transmission-reception point, selecting a second default beam for the second transmission-reception point based on the mapping, and scheduling, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE.

An apparatus for wireless communication at a base station is described. The apparatus may include a processor, memory coupled with the processor, and instructions stored in the memory. The instructions may be executable by the processor to cause the apparatus to identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE, determine a first default beam for the first transmission-reception point, select a second default beam for the second transmission-reception point based on the mapping, and schedule, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE.

Another apparatus for wireless communication at a base station is described. The apparatus may include means for identifying a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE, determining a first default beam for the first transmission-reception point, selecting a second default beam for the second transmission-reception point based on the mapping, and scheduling, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE.

A non-transitory computer-readable medium storing code for wireless communication at a base station is described. The code may include instructions executable by a processor to identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE, determine a first default beam for the first transmission-reception point, select a second default beam for the second transmission-reception point based on the mapping, and schedule, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE.

In some examples of the method, apparatuses, and non-transitory computer-readable medium described herein, the mapping indicates a first subset of control resource sets for the first transmission-reception point and a second subset of control resource sets for the second transmission-reception point, each control resource set having an associated default beam and where the first subset of control resource sets and the second subset of control resource sets are non-overlapping, and the first default beam is determined based on the first subset of control resource sets and the second default beam is determined based on the second subset of control resource sets. Some examples of the method, apparatuses, and non-transitory computer-readable medium described herein any default beam associated with the first subset of control resource sets can be concurrently received at the UE with any default beam associated with the second subset of control resource sets.

In some examples of the method, apparatuses, and non-transitory computer-readable medium described herein, the first default beam for the first transmission-reception point is determined based on control resources set of a downlink control channel reception at the UE, and the second default beam is mapped to the first default beam. In some examples of the method, apparatuses, and non-transitory computer-readable medium described herein, the mapping provides that the second default beam does not correspond to any configured control resource set of the first transmission-reception point.

A method of wireless communication at a base station is described. The method may include transmitting configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE, identifying that a time offset between a physical downlink control channel communications and a physical downlink shared channel communications of each of the first transmission-reception point and the second transmission-reception point is below a threshold, and scheduling, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE.

An apparatus for wireless communication at a base station is described. The apparatus may include a processor, memory coupled with the processor, and instructions stored in the memory. The instructions may be executable by the processor to cause the apparatus to transmit configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE, identify that a time offset between a physical downlink control channel communications and a physical downlink shared channel communications of each of the first transmission-reception point and the second transmission-reception point is below a threshold, and schedule, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE.

Another apparatus for wireless communication at a base station is described. The apparatus may include means for transmitting configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE, identifying that a time offset between a physical downlink control channel communications and a physical downlink shared channel communications of each of the first transmission-reception point and the second transmission-reception point is below a threshold, and scheduling, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE.

A non-transitory computer-readable medium storing code for wireless communication at a base station is described. The code may include instructions executable by a processor to transmit configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE, identify that a time offset between a physical downlink control channel communications and a physical downlink shared channel communications of each of the first transmission-reception point and the second transmission-reception point is below a threshold, and schedule, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE.

In some examples of the method, apparatuses, and non-transitory computer-readable medium described herein, the configuration information from the base station is transmitted in a medium access control (MAC) control element (CE). In some examples of the method, apparatuses, and non-transitory computer-readable medium described herein, a same MAC-CE indicates both the first default beam and the second default beam.

In some examples of the method, apparatuses, and non-transitory computer-readable medium described herein, the first default beam is determined based on the associated control transmission beam of the first transmission-reception point, and the second default beam is explicitly indicated in the configuration information.

DETAILED DESCRIPTION

Figure 1:
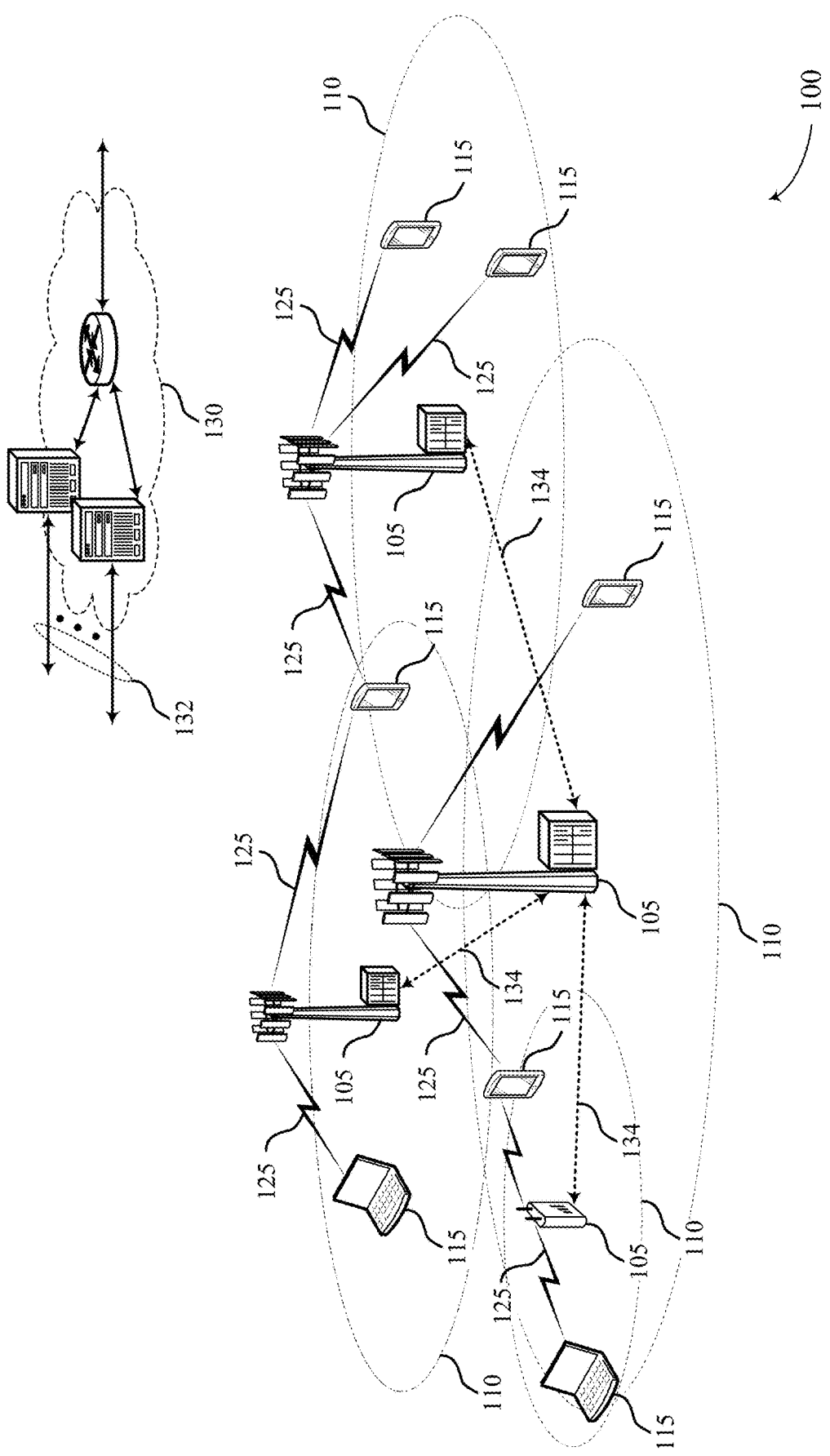
FIG. 1 illustrates an example of a system for wireless communications that supports default transmission beams for multiple transmission-reception points in wireless communications in accordance with aspects of the present disclosure.

Various provided techniques relate to default transmission beams for multiple transmission-reception points (TRPs) in wireless communications. According to various aspects, techniques are described that provide for determination of default beams of two or more TRPs for downlink communications that are concurrently received at a user equipment (UE). In some cases, a UE may receive a physical downlink control channel (PDCCH) transmission from a TRP that includes control information for decoding a subsequent physical downlink shared channel (PDSCH) transmission from the TRP. The UE may decode control information before receiving the PDSCH transmission and use the control information to configure one or more parameters for receiving and/or decoding the PDSCH transmission. In some cases, the TRP may send the PDSCH transmission close in time to or overlapping with the PDCCH transmission. If the offset between the PDCCH transmission and the PDSCH transmission is below a time threshold, the UE may not be able to decode to control information in the PDCCH with enough time to configure its receive parameters to receive and decode the PDSCH transmission. Accordingly, the UE and TRP may configure a default receive beam for buffering the PDSCH transmission while the UE receives and decodes the PDCCH control information. In some cases, a TRP may be configured with one or more control resource sets (CORESETs) that identify wireless resources that may carry downlink control information, and the default beam for the TRP may be determined as the beam associated with the CORESET with the lowest CORESET ID within the group of CORESETs.

However, in some cases multiple TRPs may be configured for simultaneous transmissions to a UE, where the UE is to simultaneously receive the multiple transmissions from the multiple TRPs. In such cases, such a selection of a default beam for each TRP may result in incompatible beams that are unable to be concurrently received by the UE. For example, a UE that is to receive concurrent downlink transmissions from multiple TRPs may use multiple antenna panels that may each be able to receive one beam at a time, and thus if two TRPs have default beams that use a same antenna panel at the UE, the UE would be unable to concurrently receive both default beams.

According to various aspects of the present disclosure, in order to allow such a UE to concurrently receive multiple transmissions from different TRPs via associated default beams, the default beams may be configured such that the UE is able to receive each default beam. In some cases, a default beam for each of multiple TRPs may be determined, and in the case that the default beams are not compatible, the UE and TRP may apply a prioritization rule to determine which TRP uses the initially determined default beam, where the other TRP(s) may use a different beam than the initially determined default beam. Such a prioritization rule may be a preconfigured rule, may be signaled by a serving base station (e.g., via radio resource control (RRC) signaling, a medium access control (MAC) control element (CE), downlink control information (DCI), or any combinations thereof). In other cases, a UE may be configured with a subset of CORESETs for each TRP, such that beams associated with different configured subsets are compatible and able to be concurrently received at the UE. In further cases, a first beam for a first TRP may be determined based on a lowest CORESET ID of the first TRP, and then a second beam for a second TRP may be determined based on a mapping to the first beam. In still further cases, a serving base station may explicitly configure default beams for one or more TRPs so as to provide compatible beams from each TRP.

Such techniques may support communications between a UE and multiple TRPs to improve throughput or improve the reliability of communications. For instance, when operating in a multi-TRP operation mode, the UE may simultaneously receive different downlink data from multiple TRPs, resulting in improved throughput, or the UE may receive the same downlink data from multiple TRPs, resulting in improved reliability (e.g., a higher chance that the data is received by the UE). Techniques as discussed herein may further enhance such reliability, throughput, or both.

Aspects of the disclosure are initially described in the context of a wireless communications system. Examples of processes and signaling exchanges that support default beam determination for multiple TRP configurations are then described. Aspects of the disclosure are further illustrated by and described with reference to apparatus diagrams, system diagrams, and flowcharts that relate to default transmission beams for multiple transmission-reception points in wireless communications.

FIG. 1 illustrates an example of a wireless communications system 100 that supports default transmission beams for multiple transmission-reception points in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, one or more base stations 105 may have one or more TRPs that are used for communications with a UE 115. In some cases, a default beam for each of multiple TRPs may be determined, and in the case that the default beams are not compatible (i.e., are unable to be concurrently received at the UE 115), the UE 115 and TRP may apply a prioritization rule to determine which TRP uses the initially determined default beam, where the other TRP(s) may use a different beam than the initially determined default beam associated with that TRP. Such a prioritization rule may be a preconfigured rule, may be signaled by a serving base station 105 (e.g., via RRC signaling, a MAC-CE, DCI, or any combinations thereof). In other cases, a UE 115 may be configured with a subset of CORESETs for each TRP, such that beams associated with different configured subsets are compatible and able to be concurrently received at the UE 115. In further cases, a first beam for a first TRP may be determined based on a lowest CORESET ID of the first TRP, and then a second beam for a second TRP may be determined based on a mapping to the first beam. In still further cases, a serving base station 105 may explicitly configure default beams for one or more TRPs so as to provide compatible default beams for each TRP.

Figure 2:
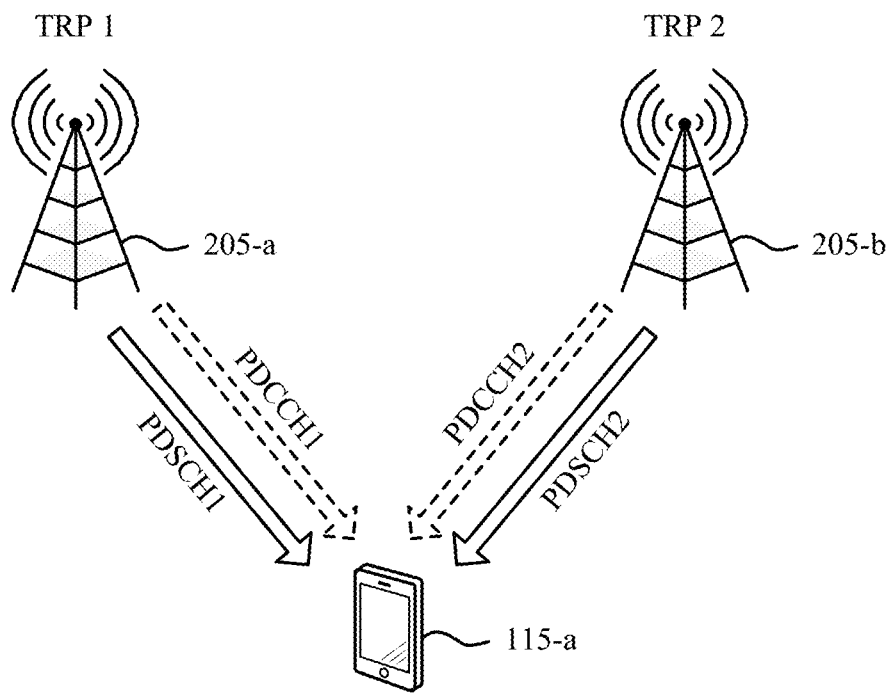
FIG. 2 illustrates an example of a portion of a wireless communications system that supports default transmission beams for multiple transmission-reception points in wireless communications in accordance with aspects of the present disclosure.

FIG. 2 illustrates an example of a wireless communications system 200 that supports default transmission beams for multiple transmission-reception points in wireless communications in accordance with aspects of the present disclosure. In some examples, wireless communications system 200 may implement aspects of wireless communications system 100.

In the example of FIG. 2, the wireless communications system 200 supports communications between a UE 115-*a* and multiple TRPs 205. Wireless communications system 200 may support multiple-PDCCH based multi-TRP or multi-panel transmission. In some cases, multi-TRP communications may be intra-cell (e.g., where TRP 205-*a* and TRP 205-*b* are associated with a same cell ID), inter-cell (e.g., where TRP 205-*a* and TRP 205-*b* are associated with different cell IDs), or combinations thereof. In the example of FIG. 2, UE 115-*a* may receive an RRC configuration from a base station (e.g., via one or more TRPs 205) that may configure multi-TRP operation in which multiple concurrent downlink transmissions from multiple TRPs 205 may be transmitted to UE 115-*a*. In some cases, default beams may be configured for TRPs 205 that may be used when a PDCCH transmission and PDSCH transmission occur within a time threshold. In some cases, the default beam for first TRP 205-*a* may be based on a configured CORESET or multiple CORESETs that the first TRP may monitor for control information. For example, the default beam may be determined based on a CORESET with a lowest CORESET ID, and a transmission control indicator (TCI) state associated with the CORESET may be used to derive the corresponding beamforming parameters. For example, the default receive beam may be derived from quasi colocation (QCL) information of the identified CORESET. In some cases, each TRP 205 may be configured with a default beam configuration. The UE 115-*a* may determine the default receive beam parameter for each of the TRPs 205 based on monitoring the TRP's 205 CORESETs, for example, in the latest slot. The UE 115-*a* may simultaneously receive a first downlink transmission from first TRP 205-a and a second downlink transmission from second TRP 205-b using the configured default receive beams.

As indicated above, in some cases, UE 115-a may be unable to concurrently receive default receive beams, such as if multiple default beams are associated with a same antenna panel. In some existing techniques for determining a default beam with multi-DCI based m-TRP operation, the beam associated with the CORESET with the lowest coreset ID within each group of CORESETs at the TRP 205 may be used to construct a default beam pair, which can be used for TDM/SDM/FDM based PDSCH reception. As indicated, such default PDSCH beams may be used to receive PDSCH when a scheduling offset between a scheduling DCI and a scheduled PDSCH is less than a beam switch latency threshold. In some cases, multi-DCI m-TRP can be identified if a higher layer TRP index per CORESET is configured and is different across CORESETs in a "PDCCH-config." As also indicated, in some cases the CORESET with the lowest CORESET ID per group may also include the constraint that in the latest monitored slot containing CORESET of the group. However, it is possible that the default beam pair with this rule may result in beams that the UE 115-a is unable to concurrently receive. For example, CORESET 0 is proposed to be in group 0 and when CORESET 0 defines the default beam with group 0, it may not be compatible with the CORESETs in the other group (e.g. they cannot be received simultaneously for SDM based PDSCH reception).

In order to provide beams for each TRP 205 that can be concurrently received at the UE 115-a, in some cases a default beam prioritization rule may be used in the event that the UE 115-a is unable to receive concurrent default beams based on the above-described rule (i.e., the beam associated with the lowest CORESET ID of the group of CORESETs configured for the TRP 205) for determination of default beams. In such cases, an initial default beam is determined per TRP 205, where each beam in the pair is associated with the lowest CORESET within each group of CORESETs of the respective TRPs 205. In instances when the beam pair is not compatible, the prioritization rule may be used to determine which TRP 205 is to use the initially determined default beam, and the other TRP 205 may use a different beam that is compatible (e.g., based on a lowest CORESET with a compatible beam). In some cases, the prioritization rule may provide that a fixed group or TRP has higher priority (e.g., it may be specified that the lowest TRP index value always has higher priority).

In other cases, the fixed group may be dynamically indicated by a base station (e.g., via RRC/MAC-CE/DCI). In further cases, the fixed group may be determined based on certain rule, such as the group with more CORESETs or the group whose CORESET has a shortest search space monitoring period. In still further cases, the fixed group may be for the TRP 205 used by a source or target cell during a handover procedure. In further cases, the default beam can change dynamically between TRPs 205 based on a rule, such as the first TRP 205-a default beam being prioritized in even slots and second TRP 205-b default beam being prioritized in odd slots, or the default beam associated with lower CORESET ID among the incompatible CORESETs being prioritized. In some cases, both the UE 115-a and TRPs 205 can use the prioritized default beam and another beam of the other TRP that is compatible. In some cases, the UE 115-a may identify incompatible beams and transmit a beam report on incompatible beams, which may be used by a serving base station to schedule concurrent transmissions using beams that are to be monitored by the UE 115-a.

In other cases, each TRP 205 may be configured with a subset of CORESETs with default beams that are compatible for the UE 115-a. For example, the UE 115-a may be configured with 3 CORESETs (e.g., CORESET 0/1/2) with group zero associated with the first TRP 205-a, and two CORESETs (e.g., CORESETs 3/4) with group one associated with the second TRP 205-b. The default beam for the first TRP 205-a can only be associated with CORESET 0/1/2 for the first TRP 205-a, and can only be associated with CORESETs 3/4 for the second TRP 205-b (or an even smaller subset depending on the subset configuration for default beam derivation). In such cases, a serving base station may configure the subsets of CORESETs such that the default beams in any combination are compatible.

In other cases, a compatible default beam for the second TRP 205-b may be determined based on the default beam of the first TRP 205-a. In such cases, a first default beam for the first TRP 205-a may follow the lowest CORESET index within the CORESETs (or subset of CORESETs) and an associated second default beam for the second TRP 205-a may be defined (e.g., based on a mapping between the first default beam and the second default beam, where the mapping may be signaled by a serving base station, pre-specified, etc.), where the first and second default beams are compatible for the UE 115-a. For example, if the first default beam for the first TRP 205-a is beam-0, the UE 115-a may automatically choose beam-1 as the second default beam (e.g., based on a mapping), where beam-1 may not correspond to the lowest CORESET of the second TRP 205-b or not correspond to any coresets of the second TRP 205-b.

In other cases, the default beam for each TRP 205 may be decoupled from the PDCCH beam of the TRP 205. In such cases, a serving base station may signal the default beam(s) for each TRP, and provide an explicit indication of the default beams to be used. In some cases, an indication of the configured default beams may be provided in signaling from base station, such as in a MAC-CE, RRC signaling, and the like. In some cases, a single MAC-CE may indicate both default beams for both TRPs 205. In other cases, different MAC-CEs may indicate default beams separately for the TRPs 205. Further, in some cases the default beam for the first TRP 205-a may be determined based on a lowest CORESET ID, and the default beam for the second TRP 205-b may be indicated by MAC-CE or other signaling from the base station.

Figure 3:
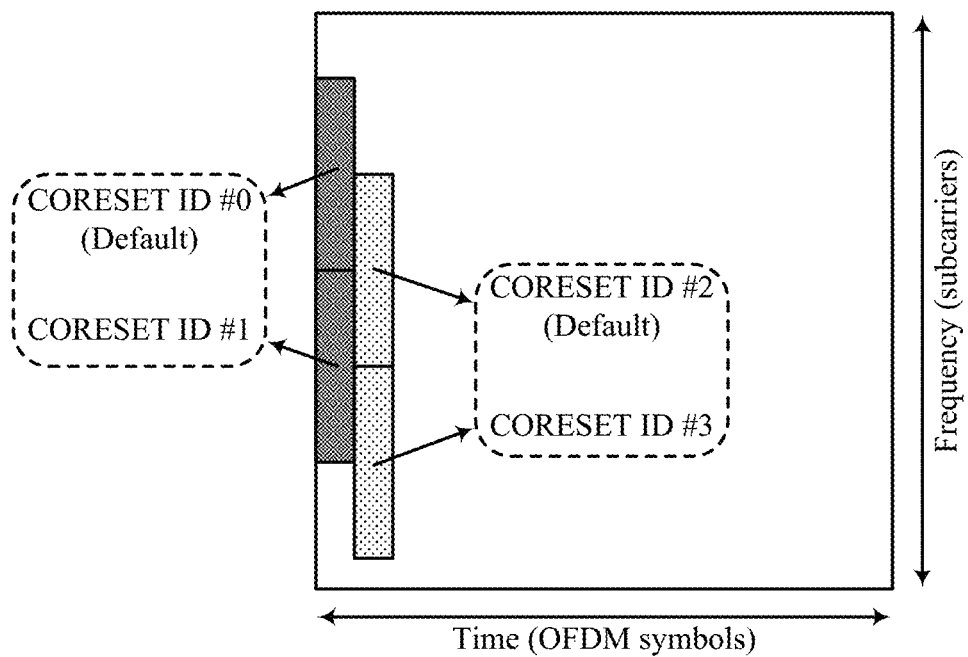
FIG. 3 illustrates an example of CORESETs monitored by UEs that support default transmission beams for multiple transmission-reception points in wireless communications in accordance with aspects of the present disclosure.

FIG. 3 illustrates an example of CORESETs 300 monitored by UEs that support default transmission beams for multiple transmission-reception points in wireless communications in accordance with aspects of the present disclosure. In some examples, CORESETs 300 may be implemented in aspects of wireless communications system 100 or 200. In this example, CORESETs 300 may be monitored by a UE for control information from multiple TRPs in accordance with aspects of the present disclosure. For example, the UE may monitor CORESETs 305 (e.g., with IDs #0 and #1) for control information from a first TRP and CORESETs 310 (e.g., with IDs #2 and #3) for control information from a second TRP. In other examples, the number of CORESETs assigned to each TRP may be different. In this example, the lowest CORESET ID of each group of CORESETS 305, 310, may be used to determine the default beam.

As discussed with reference to FIG. 2, in some cases a prioritization rule may be used in the event that the default beams are not able to be received at a UE to determine which TRP uses the initially determined default beam, where the other TRP(s) may use a different beam than the initially determined default beam associated with that TRP. In other cases, the configured groups of CORESETs 305 and CORESETs 310 may be selected such that corresponding beams are compatible and able to be concurrently received at the UE. In further cases, a first beam for a first TRP may be determined based on a lowest CORESET ID of CORESETs 305, and then a second beam for a second TRP may be determined based on a mapping to the first beam. In still further cases, a serving base station 105 may explicitly configure default beams for one or more TRPs so as to provide compatible default beams for each TRP.

By supporting communications with multiple TRPs, a UE may be able to improve throughput and improve the reliability of communications in a wireless communications system. For instance, when operating in a multi-TRP operation mode, the UE may simultaneously receive different downlink data from multiple TRPs, resulting in improved throughput, or the UE may receive the same downlink data from multiple TRPs, resulting in improved reliability (e.g., a higher chance that the data is received by the UE).

Figure 4:
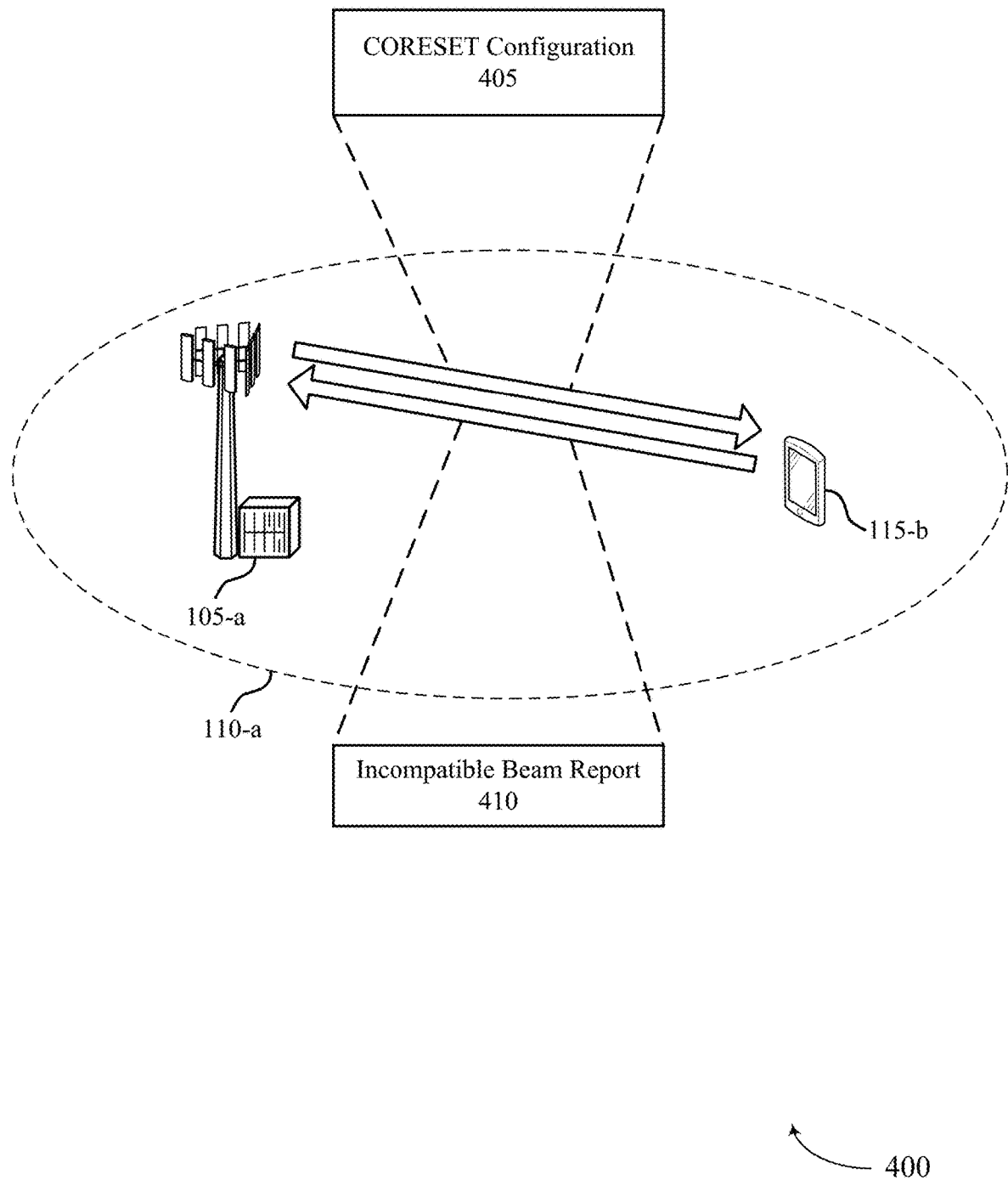
FIG. 4 illustrates an example of a wireless communications system that supports default transmission beams for multiple transmission-reception points in wireless communications in accordance with aspects of the present disclosure.

FIG. 4 illustrates an example of a wireless communications system 400 that supports default transmission beams for multiple transmission-reception points in wireless communications in accordance with aspects of the present disclosure. In some examples, wireless communications system 400 may implement aspects of wireless communications system 100 or 200. Wireless communications system 400 includes base station 105-a, which may be an example of a base station 105 described with reference to FIGS. 1-2. Wireless communications system 400 also includes UE 115-b, which may be an example of a UE 115 described with reference to FIGS. 1-2. Base station 105-a may provide communication coverage for a geographical coverage area 110-a, which may be an example of a coverage area 110 described with reference to FIG. 1. Wireless communications system 400 may implement aspects of wireless communications system 100.

In the example of FIG. 4, UE 115-b may be configured to communicate with at least a first TRP and a second TRP in a multi-TRP operation mode. For instance, UE 115-b may receive a control message (e.g., RRC message) with a CORESET configuration 405 from base station 105-a indicating that UE 115-b is to communicate with the first TRP and the second TRP in the multi-TRP operation mode. The control message may indicate CORESETs for the UE 115-c to monitor for control information from each TRP in the multi-TRP operation mode. Thus, UE 115-b may monitor a first set of CORESETs for control information from the first TRP and a second set of CORESETs for control information from the second TRP.

In order to select default beams for each TRP that concurrently transmits to the UE 115-b, the UE 115-b in this example may transmit an incompatible beam report 410 to the base station 105-a. The incompatible beam report 410 may provide, for example, a list of beams that may not be concurrently received at the UE 115-b. For example, each TRP may include three CORESETs and the UE 115-b may report a three-by-three matrix with each entry indicating a "1" to indicate that the corresponding CORESETs from two TRPs and corresponding default beams from each TRP that may be simultaneously received. In further examples, the UE 115-b may report CORESET groups individually, which may include each row in a table corresponding to one CORESET group. As such, a first row may include an indication for a first CORESET from the first TRP and a second CORESET from the second TRP indicating that both CORESETs can be received by the UE 115-b simultaneously.

Figure 5:
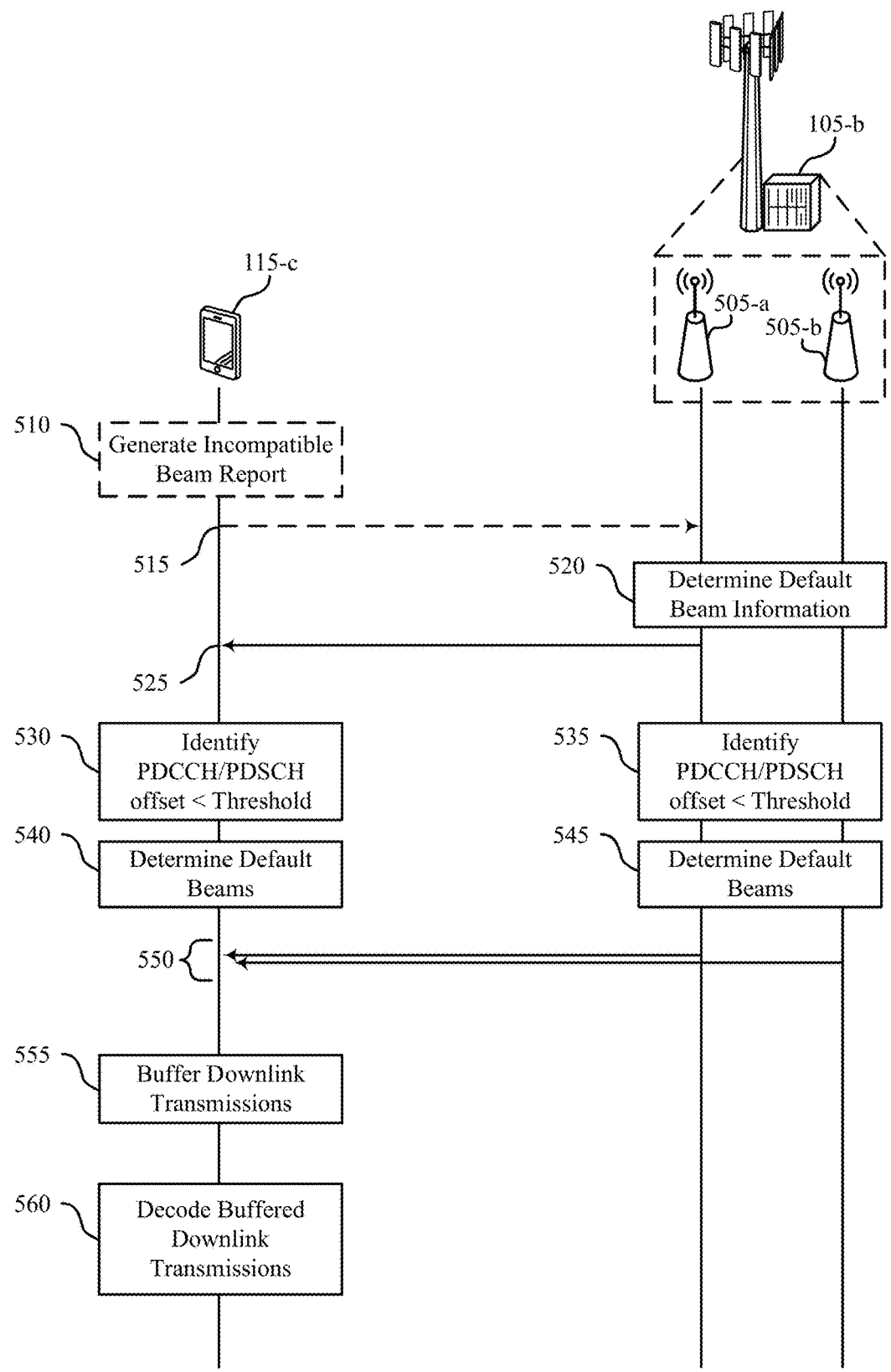
FIG. 5 illustrates an example of a process flow that supports default transmission beams for multiple transmission-reception points in wireless communications in accordance with aspects of the present disclosure.

FIG. 5 illustrates an example of a process flow 500 that supports default transmission beams for multiple transmission-reception points in wireless communications in accordance with aspects of the present disclosure. In some examples, process flow 500 may implement aspects of wireless communications system 100, 200, or 400. Process flow 500 may include UE 115-c and base station 105-b, which may be respective examples of a UE and a base station described herein. In the following description of the process flow 500, the operations between UE 115-c and base station 105-b may be transmitted in a different order than the order shown, or the operations performed by base station 105-b and UE 115-c may be performed in different orders or at different times. Certain operations may also be left out of the process flow 500, or other operations may be added to the process flow 500. It is to be understood that while base station 105-b and UE 115-c are shown performing a number of the operations of process flow 500, any wireless device may perform the operations shown.

For example, base station 105-b may control or configure a first TRP 505-a and a second TRP 505-b, and TRP 505-a and TRP 505-b may perform some operations on behalf of the base station 105-b. In some cases, base station 105-b may refer to TRP 505-a and TRP 505-b. As discussed herein, base station 105-b may identify that an offset between a PDCCH and a PDSCH is below a threshold (e.g., that an offset between a received PDCCH and a corresponding PDSCH is below a threshold). Base station 105-b may then identify a first beam for a first TRP (e.g., TRP 505-a) and a second beam for a second TRP (e.g., TRP 505-b) based on the identification that the offset is below the threshold, and may schedule a simultaneous transmission (e.g., in parallel during a symbol) from the TRP 505-a and the TRP 505-b (e.g., where TRP 505-a is scheduled based on the identified first beam and the TRP 505-b is scheduled based on the identified second beam).

Optionally, at 510, the UE 115-c may generate an incompatible beam report (which may also be referred to as a panel ID report), and at 515 may transmit the report to the base station 105-b (e.g., via first TRP 505-a). The incompatible beam report may indicate beams of different CORESETs of the different TRPs 505 that can be concurrently received and that cannot be concurrently received at the UE 115-c (e.g., based on whether associated beams of different CORESETs use a same antenna panel or different antenna panels at the UE 115-c).

At 520, the base station 105-b may determine a default beam configuration, which may be transmitted to the UE 115-c at 515 (e.g., via the first TRP 505-a). In some cases, the default beam information may be transmitted in RRC signaling, a MAC-CE, or DCI. In some cases, a first default beam and a second default beam (e.g., scheduled for TRP 505-a and TRP 505-b, respectively) may be associated with a CORESET of the subset of the one or more CORESETs (e.g., where the CORESET corresponds to a lowest CORESET ID). The default beam information may be identified according to techniques such as described herein.

At 530, UE 115-c may determine that an offset between a PDCCH and a PDSCH is below a threshold (e.g., UE 115-c may receive PDCCH and identify that corresponding PDSCH is to be received according to a timing offset, from the PDCCH, that is below a threshold associated with switching UE 115-c components between beams). Likewise, at 535, the base station 105-b may determine that the offset between the PDCCH and PDSCH is below a threshold.

At 540, the UE 115-c may determine default beams based on the identification that the offset is below the threshold and the default beam information. For example, the UE 115-c may determine a first default beam of the first TRP 505-a and a second default beam of the second TRP 505-b. The default beams may be identified according to techniques such as described herein. Likewise, at 545, the base station may determine default beams based on the identification that the offset is below the threshold and the default beam information, and may schedule transmissions at the first TRP 505-a using the first default beam and at the second TRP 505-b using the second default beam.

At 550, first TRP 505-a may transmit and the UE 115-c may receive a first beam using a first set of beamforming parameters of the first default beam. Further, the second TRP 505-b may transmit and the UE 115-c may receive a second beam using a second set of beamforming parameters of the second default beam. As discussed herein, in some cases, UE 115-c may monitor in a slot based on a first set of beamforming parameters of the first default beam and a second set of beamforming parameters of the second default beam based on the identified configuration (e.g., beamforming parameters of the default receive beam(s) may be derived from QCL of CORESET associated with the default beam).

At 555, UE 115-c may buffer a first set of downlink transmissions received on the first beam from the TRP 505-a and a second set of downlink transmissions received on the second beam from the TRP 505-b.

At 525, UE 115-c may decode the buffered first set of downlink transmissions and the buffered second set of downlink transmissions.

Figure 6:
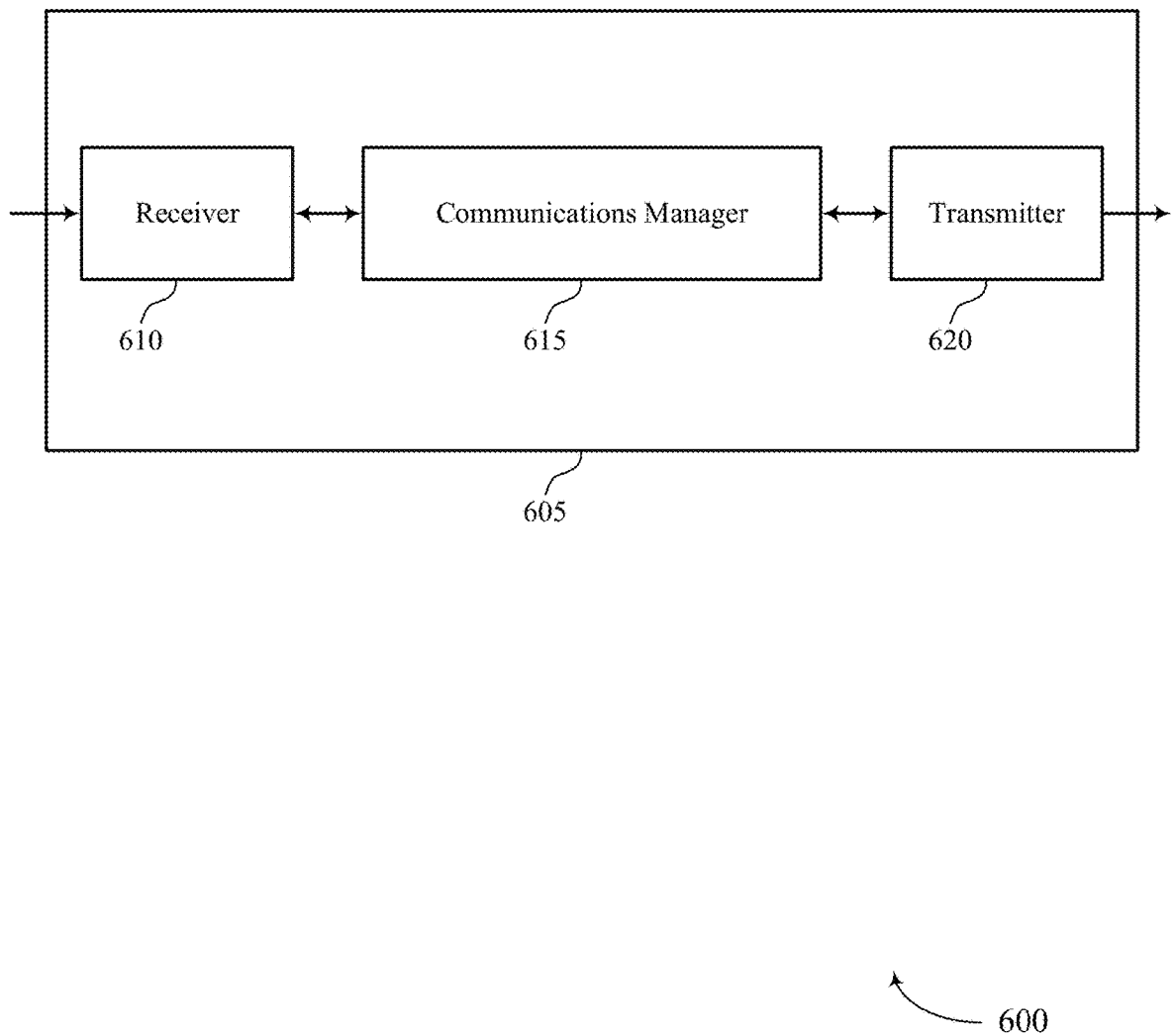
FIGS. 6 and 7 show block diagrams of devices that support default transmission beams for multiple transmission-reception points in wireless communications in accordance with aspects of the present disclosure.

FIG. 6 shows a block diagram 600 of a device 605 that supports default transmission beams for multiple transmission-reception points in wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to default transmission beams for multiple transmission-reception points in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a first default beam for receiving downlink transmissions from a first transmission-reception point and a second default beam for receiving downlink transmissions from a second transmission-reception point, determine that the first default beam and the second default beam are incapable of concurrent reception at the UE, select, responsive to the determining and based at least in part on a predetermined prioritization rule, one of the first and second default beams, and receive downlink communications from the transmission-reception point associated with the selected default beam.

The communications manager 615 may also identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points, determine a first default beam for the first transmission-reception point, select a second default beam for the second transmission-reception point based on the mapping, and receive concurrent downlink communications from the first transmission-reception point using the first default beam and from the second transmission-reception point using the second default beam.

The communications manager 615 may also receive configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE, identify that a time offset between a physical downlink control channel transmission and a physical downlink shared channel transmission of each of the first transmission-reception point and the second transmission-reception point is below a threshold, and receive, based on the identification that the time offset is below the threshold, the first default beam from the first transmission-reception point concurrently with the second default beam from the second transmission-reception point. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
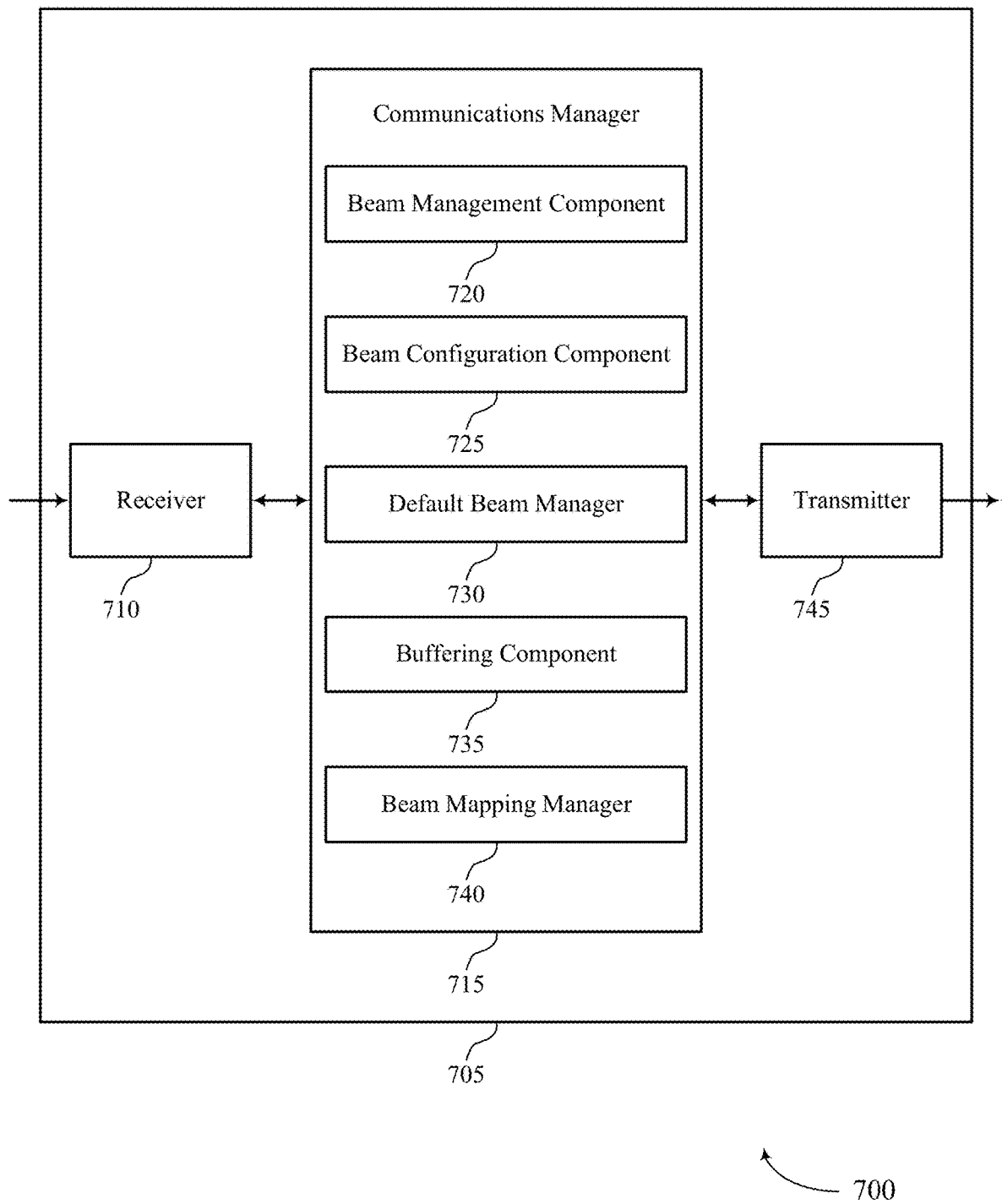

FIG. 7 shows a block diagram 700 of a device 705 that supports default transmission beams for multiple transmission-reception points in wireless communications in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to default transmission beams for multiple transmission-reception points in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a beam management component 720, a beam configuration component 725, a default beam manager 730, a buffering component 735, and a beam mapping manager 740. The communications manager 715 may be an example of aspects of the communications manager 910 described herein.

In some cases, the beam management component 720 may identify a first default beam for receiving downlink transmissions from a first transmission-reception point and a second default beam for receiving downlink transmissions from a second transmission-reception point. The beam configuration component 725 may determine that the first default beam and the second default beam are incapable of concurrent reception at the UE. The default beam manager 730 may select, responsive to the determining and based at least in part on a predetermined prioritization rule, one of the first and second default beams. The buffering component 735 may receive downlink communications from the transmission-reception point associated with the selected default beam.

In some cases, the beam mapping manager 740 may identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points. The default beam manager 730 may determine the first default beam for the first transmission-reception point and select the second default beam for the second transmission-reception point based on the mapping. The buffering component 735 may receive concurrent downlink communications from the first transmission-reception point using the first default beam and from the second transmission-reception point using the second default beam.

In some cases, the beam configuration component 725 may receive configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE. The default beam manager 730 may identify that a time offset between a physical downlink control channel transmission and a physical downlink shared channel transmission of each of the first transmission-reception point and the second transmission-reception point is below a threshold. The buffering component 735 may receive, based on the identification that the time offset is below the threshold, the first default beam from the first transmission-reception point concurrently with the second default beam from the second transmission-reception point.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
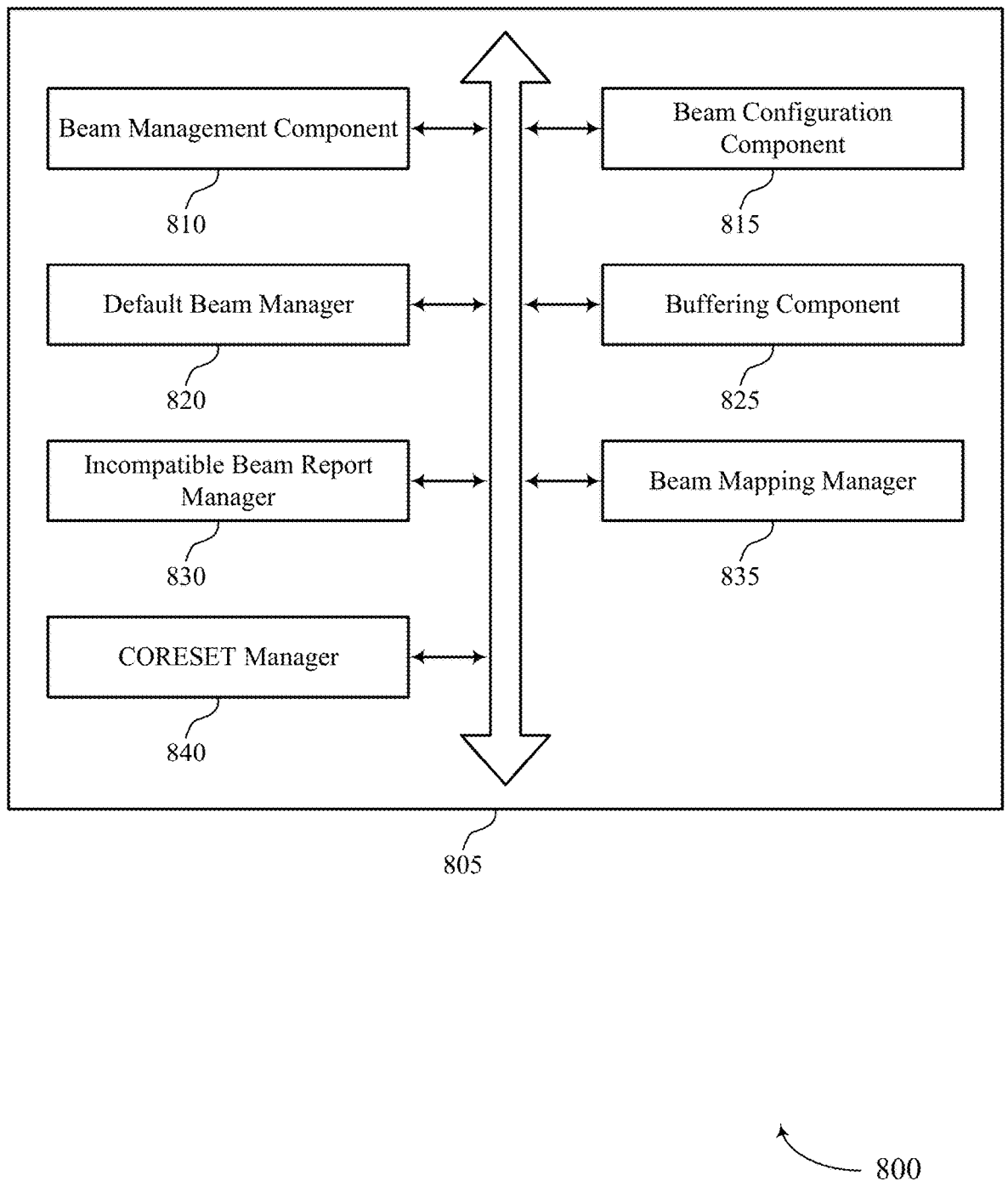
FIG. 8 shows a block diagram of a communications manager that supports default transmission beams for multiple transmission-reception points in wireless communications in accordance with aspects of the present disclosure.

FIG. 8 shows a block diagram 800 of a communications manager 805 that supports default transmission beams for multiple transmission-reception points in wireless communications in accordance with aspects of the present disclosure. The communications manager 805 may be an example of aspects of a communications manager 615, a communications manager 715, or a communications manager 910 described herein. The communications manager 805 may include a beam management component 810, a beam configuration component 815, a default beam manager 820, a buffering component 825, an incompatible beam report manager 830, a beam mapping manager 835, and a CORE-SET manager 840. Each of these modules may communicate, directly or indirectly, with one another (e.g., via one or more buses).

The beam management component 810 may identify a first default beam for receiving downlink transmissions from a first transmission-reception point and a second default beam for receiving downlink transmissions from a second transmission-reception point.

The beam configuration component 815 may determine that the first default beam and the second default beam are incapable of concurrent reception at the UE. In some examples, the beam configuration component 815 may receive configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE. In some cases, the configuration information from the base station is received in a medium access control (MAC) control element (CE). In some cases, a same MAC-CE indicates both the first default beam and the second default beam. In some cases, the first default beam is determined based on the associated control transmission beam of the first transmission-reception point, and the second default beam is explicitly indicated in the configuration information.

The default beam manager 820 may select, responsive to the determining and based at least in part on a predetermined prioritization rule, one of the first and second default beams.

In some examples, the default beam manager 820 may determine the first default beam for the first transmission-reception point. In some examples, the default beam manager 820 may select the second default beam for the second transmission-reception point based on the mapping.

In some examples, the default beam manager 820 may identify that a time offset between a physical downlink control channel transmission and a physical downlink shared channel transmission of each of the first transmission-reception point and the second transmission-reception point is below a threshold.

In some examples, the default beam manager 820 may determine that the first transmission-reception point is associated with a first control resource set group and the second transmission-reception point is associated with a second control resource set group, where the first control resource set group is associated with the first default beam and the second control resource set group is associated with the second default beam, and where the predetermined prioritization rule indicates which of the first control resource set group or the second control resource set group has a higher priority.

In some examples, the default beam manager 820 may receive an indication from a base station that indicates which of the first control resource set group or the second control resource set group has a higher priority. In some examples, the default beam manager 820 may determine one or more parameters of each of the first control resource set group and the second control resource set group, where the predetermined prioritization rule is based on the determined one or more parameters. In some cases, the predetermined prioritization rule indicates a prespecified priority of the first control resource set group and the second control resource set group. In some cases, the indication from the base station is provided in a RRC transmission, a MAC-CE, in DCI, or any combinations thereof. In some cases, the one or more parameters include one or more of a number of control resource sets in each of the first control resource set group and the second control resource set group, a search space monitoring period of each of the first control resource set group and the second control resource set group, or any combinations thereof.

In some cases, the predetermined prioritization rule indicates a transmission-reception point associated with a handover operation has priority over other transmission-reception points.

In some cases, the predetermined prioritization rule provides that priorities for different transmission-reception points can change based on one or more parameters. In some cases, the one or more parameters include transmission slots, and where the first default beam for the first transmission-reception point is selected for a first subset of transmission slots, and the second default beam for the second transmission-reception point is selected for a second subset of transmission slots. In some cases, the one or more parameters include a value of a control resource set identification associated with each of the first transmission-reception point and the second transmission-reception point, and where a lowest valued control resource set identification has a highest priority and the associated default transmission beam is selected for communications with the associated transmission-reception point.

The buffering component 825 may receive downlink communications from the transmission-reception point associated with the selected default beam. In some examples, the buffering component 825 may receive, based on the identification that the time offset is below the threshold, the first default beam from the first transmission-reception point concurrently with the second default beam from the second transmission-reception point.

The beam mapping manager 835 may identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points. In some examples, any default beam associated with the first subset of control resource sets can be concurrently received at the UE with any default beam associated with the second subset of control resource sets. In some cases, the mapping indicates a first subset of control resource sets for the first transmission-reception point and a second subset of control resource sets for the second transmission-reception point, each control resource set having an associated default beam and where the first subset of control resource sets and the second subset of control resource sets are non-overlapping. In some cases, the first default beam is determined based on the first subset of control resource sets and the second default beam is determined based on the second subset of control resource sets.

The incompatible beam report manager 830 may transmit, to a serving base station, an incompatible beam report that indicates beams that are not able to be concurrently received at the UE.

The CORESET manager 840 may determine one or more control resource sets associated with different transmission reception points. In some cases, the first default beam for the first transmission-reception point is determined based on a control resource set of a downlink control channel reception at the UE, and the second default beam is mapped to the first default beam. In some cases, the mapping provides that the second default beam does not correspond to any configured control resource set of the first transmission-reception point.

Figure 9:
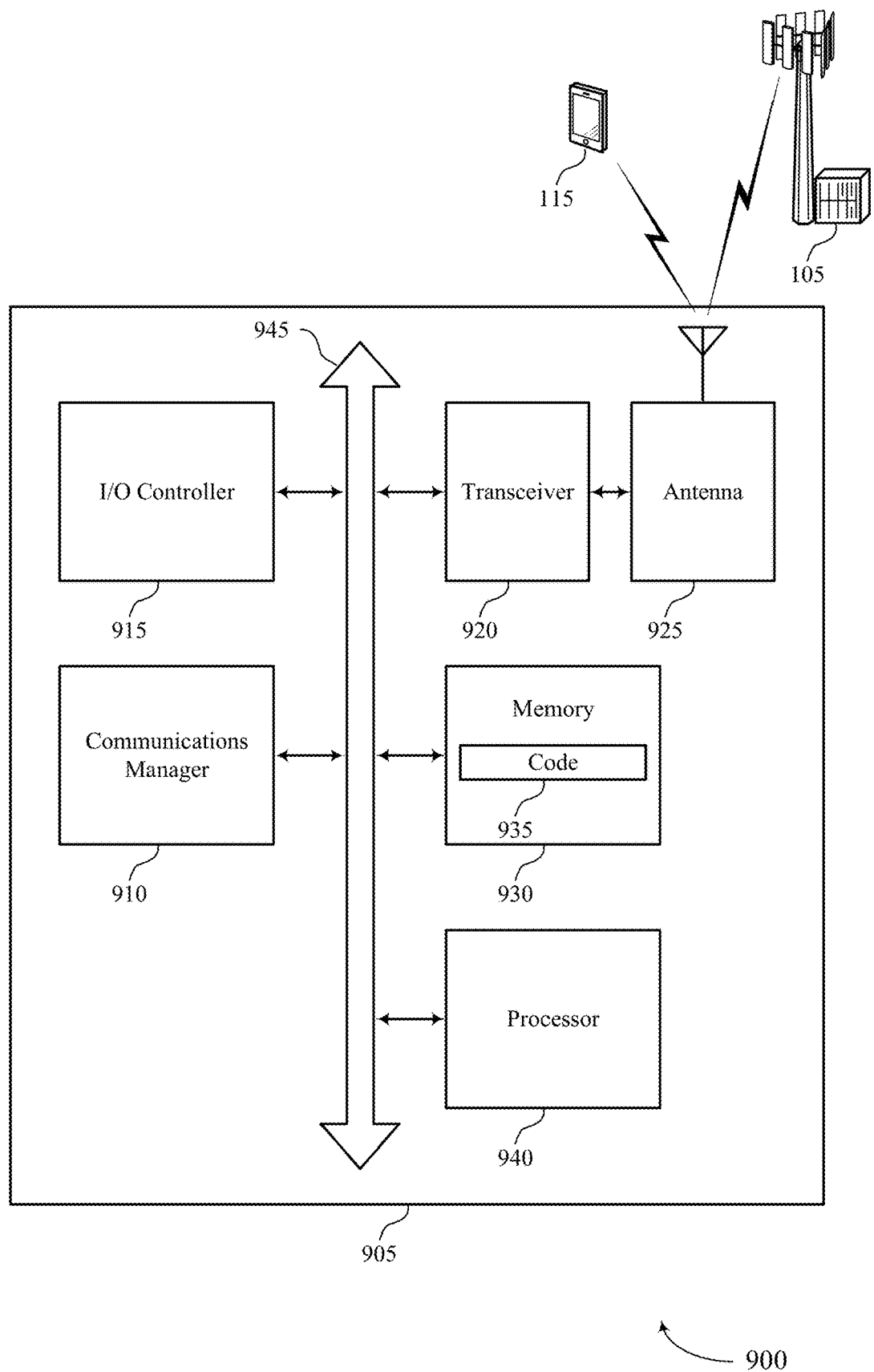
FIG. 9 shows a diagram of a system including a device that supports default transmission beams for multiple transmission-reception points in wireless communications in accordance with aspects of the present disclosure.

FIG. 9 shows a diagram of a system 900 including a device 905 that supports default transmission beams for multiple transmission-reception points in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a first default beam for receiving downlink transmissions from a first transmission-reception point and a second default beam for receiving downlink transmissions from a second transmission-reception point, determine that the first default beam and the second default beam are incapable of concurrent reception at the UE, select, responsive to the determining and based at least in part on a predetermined prioritization rule, one of the first and second default beams, and receive downlink communications from the transmission-reception point associated with the selected default beam.

The communications manager 910 may also identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points, determine a first default beam for the first transmission-reception point, select a second default beam for the second transmission-reception point based on the mapping, and receive concurrent downlink communications from the first transmission-reception point using the first default beam and from the second transmission-reception point using the second default beam.

The communications manager 910 may also receive configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE, identify that a time offset between a physical downlink control channel transmission and a physical downlink shared channel transmission of each of the first transmission-reception point and the second transmission-reception point is below a threshold, and receive, based on the identification that the time offset is below the threshold, the first default beam from the first transmission-reception point concurrently with the second default beam from the second transmission-reception point.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting default transmission beams for multiple transmission-reception points in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
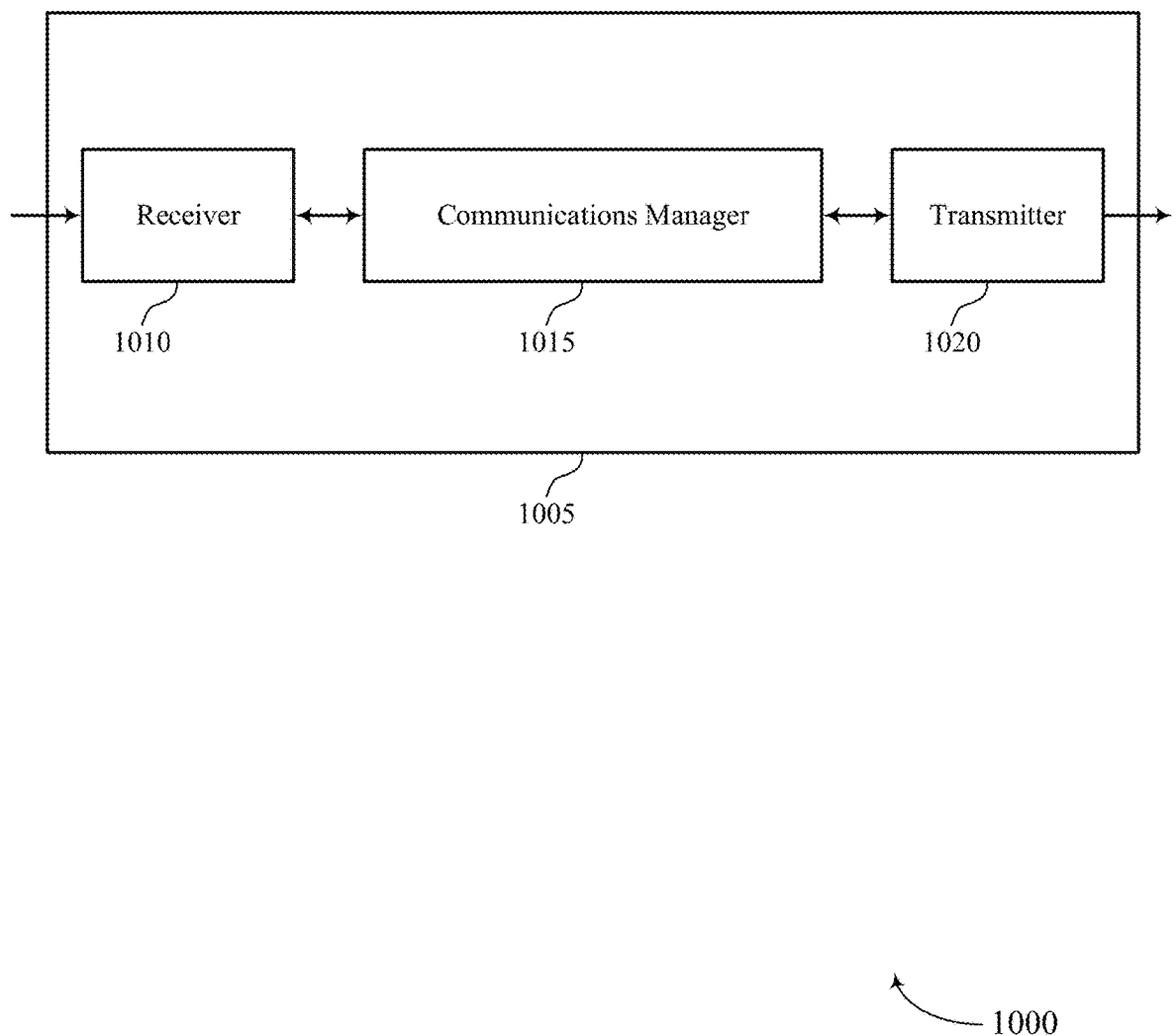
FIGS. 10 and 11 show block diagrams of devices that support default transmission beams for multiple transmission-reception points in wireless communications in accordance with aspects of the present disclosure.

FIG. 10 shows a block diagram 1000 of a device 1005 that supports default transmission beams for multiple transmission-reception points in wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to default transmission beams for multiple transmission-reception points in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a first default beam for transmitting a first downlink communication from a first transmission-reception point to a UE and a second default beam for transmitting a second downlink communication from a second transmission-reception point to the UE, determine that the first default beam and the second default beam are incapable of concurrent reception at the UE, and schedule, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE.

The communications manager 1015 may also identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE, determine a first default beam for the first transmission-reception point, select a second default beam for the second transmission-reception point based on the mapping, and schedule, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE.

The communications manager 1015 may also transmit configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE, identify that a time offset between a physical downlink control channel communications and a physical downlink shared channel communications of each of the first transmission-reception point and the second transmission-reception point is below a threshold, and schedule, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
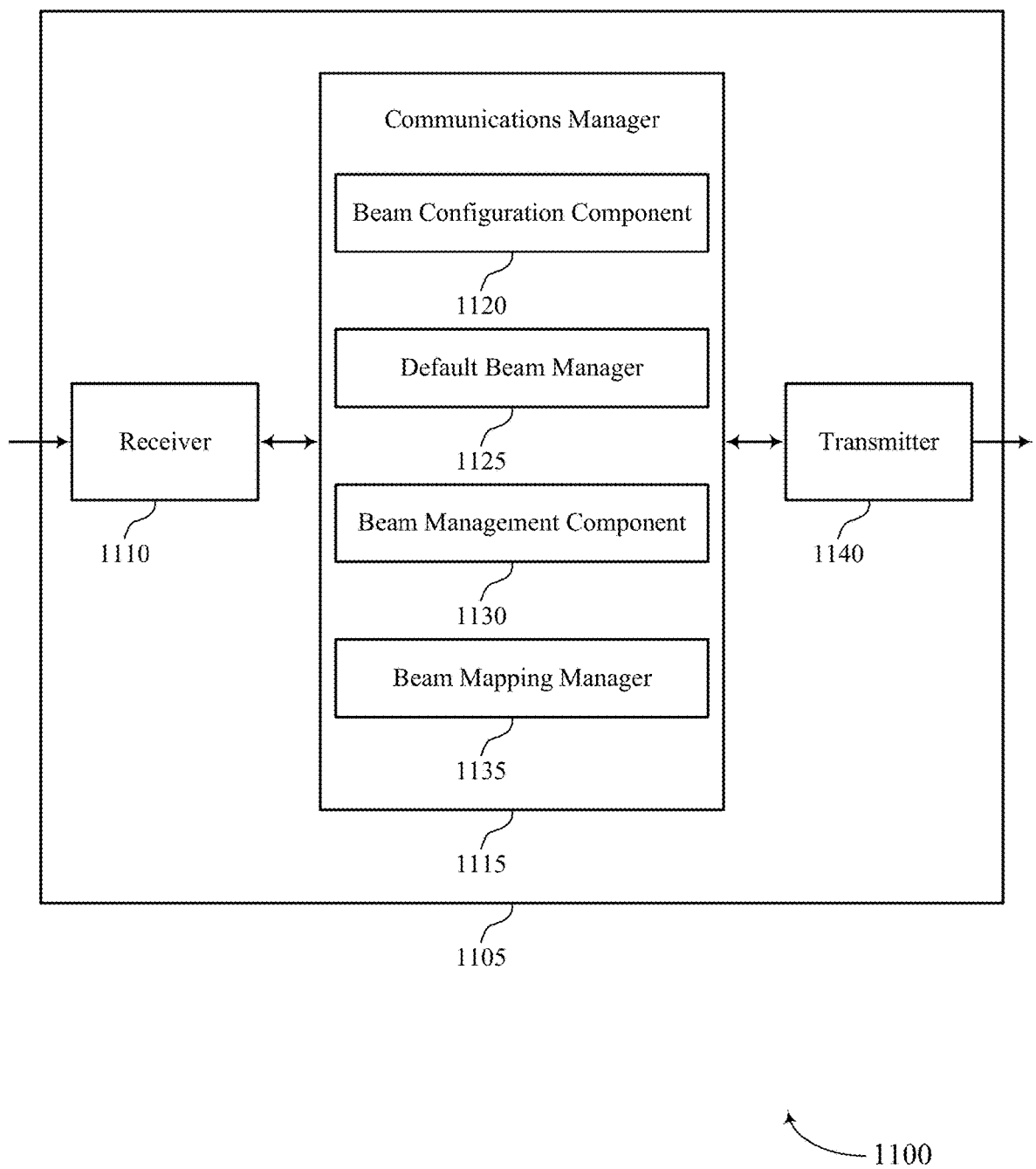

FIG. 11 shows a block diagram 1100 of a device 1105 that supports default transmission beams for multiple transmission-reception points in wireless communications in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to default transmission beams for multiple transmission-reception points in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a beam configuration component 1120, a default beam manager 1125, a beam management component 1130, and a beam mapping manager 1135. The communications manager 1115 may be an example of aspects of the communications manager 1310 described herein.

In some cases, the beam configuration component 1120 may identify a first default beam for transmitting a first downlink communication from a first transmission-reception point to a UE and a second default beam for transmitting a second downlink communication from a second transmission-reception point to the UE. The default beam manager 1125 may determine that the first default beam and the second default beam are incapable of concurrent reception at the UE. The beam management component 1130 may schedule, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE.

In some cases, the beam mapping manager 1135 may identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE. The default beam manager 1125 may determine a first default beam for the first transmission-reception point and select a second default beam for the second transmission-reception point based on the mapping. The beam management component 1130 may schedule, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE.

In some cases, the beam configuration component 1120 may transmit configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE. The default beam manager 1125 may identify that a time offset between a physical downlink control channel communications and a physical downlink shared channel communications of each of the first transmission-reception point and the second transmission-reception point is below a threshold. The beam management component 1130 may schedule, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
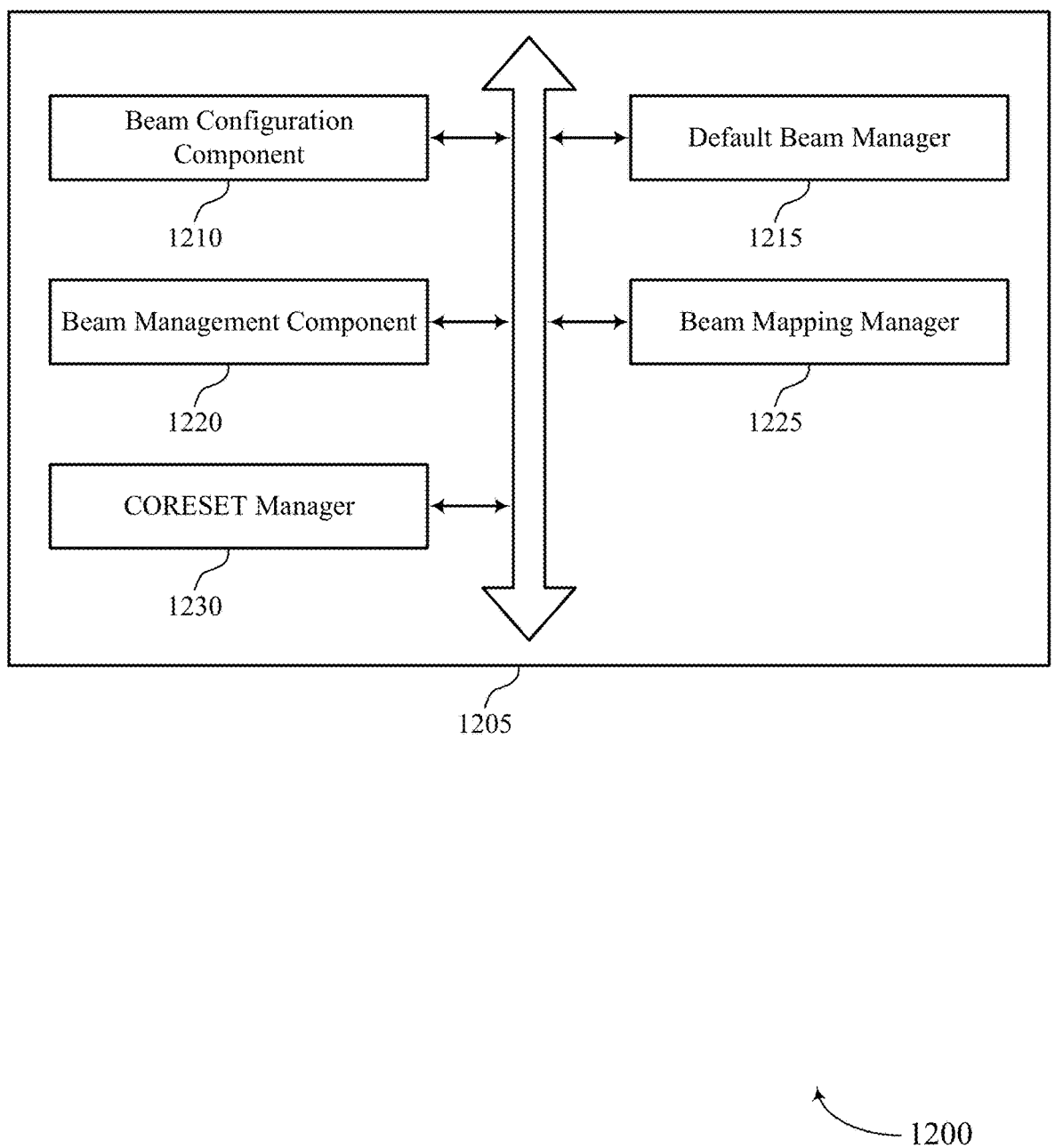
FIG. 12 shows a block diagram of a communications manager that supports default transmission beams for multiple transmission-reception points in wireless communications in accordance with aspects of the present disclosure.

FIG. 12 shows a block diagram 1200 of a communications manager 1205 that supports default transmission beams for multiple transmission-reception points in wireless communications in accordance with aspects of the present disclosure. The communications manager 1205 may be an example of aspects of a communications manager 1015, a communications manager 1115, or a communications manager 1310 described herein. The communications manager 1205 may include a beam configuration component 1210, a default beam manager 1215, a beam management component 1220, a beam mapping manager 1225, and a CORESET manager 1230. Each of these modules may communicate, directly or indirectly, with one another (e.g., via one or more buses).

The beam configuration component 1210 may identify a first default beam for transmitting a first downlink communication from a first transmission-reception point to a UE and a second default beam for transmitting a second downlink communication from a second transmission-reception point to the UE.

In some examples, the beam configuration component 1210 may transmit configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE. In some cases, the configuration information from the base station is transmitted in a MAC-CE. In some cases, a same MAC-CE indicates both the first default beam and the second default beam. In some cases, the first default beam is determined based on the associated control transmission beam of the first transmission-reception point, and the second default beam is explicitly indicated in the configuration information.

The default beam manager 1215 may determine that the first default beam and the second default beam are incapable of concurrent reception at the UE. In some examples, the default beam manager 1215 may determine the first default beam for the first transmission-reception point. In some examples, the default beam manager 1215 may select the second default beam for the second transmission-reception point based on the mapping. In some examples, the default beam manager 1215 may identify that a time offset between a physical downlink control channel communications and a physical downlink shared channel communications of each of the first transmission-reception point and the second transmission-reception point is below a threshold.

In some examples, the default beam manager 1215 may determine that the first transmission-reception point is associated with a first control resource set group and the second transmission-reception point is associated with a second control resource set group, where the first control resource set group is associated with the first default beam and the second control resource set group is associated with the second default beam, and where the predetermined prioritization rule indicates which of the first control resource set group or the second control resource set group has a higher priority. In some examples, the default beam manager 1215 may transmit an indication to the UE that indicates which of the first control resource set group or the second control resource set group has a higher priority. In some examples, the default beam manager 1215 may determine one or more parameters of each of the first control resource set group and the second control resource set group, where the predetermined prioritization rule is based on the determined one or more parameters. In some cases, the predetermined prioritization rule indicates a prespecified priority of the first control resource set group and the second control resource set group. In some cases, the one or more parameters include one or more of a number of control resource sets in each of the first control resource set group and the second control resource set group, a search space monitoring period of each of the first control resource set group and the second control resource set group, or any combinations thereof.

In some cases, the predetermined prioritization rule provides that priorities for different transmission-reception points can change based on one or more parameters. In some cases, the one or more parameters include transmission slots, and where the first default beam for the first transmission-reception point is selected for a first subset of transmission slots, and the second default beam for the second transmission-reception point is selected for a second subset of transmission slots. In some cases, the one or more parameters include a value of a control resource set identification associated with each of the first transmission-reception point and the second transmission-reception point, and where a lowest valued control resource set identification has a highest priority and the associated default transmission beam is selected for communications with the associated transmission-reception point.

The beam management component 1220 may schedule, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE.

In some examples, the beam management component 1220 may schedule, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE.

In some examples, the beam management component 1220 may schedule, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE.

The beam mapping manager 1225 may identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE. In some examples, any default beam associated with the first subset of control resource sets can be concurrently received at the UE with any default beam associated with the second subset of control resource sets. In some cases, the mapping indicates a first subset of control resource sets for the first transmission-reception point and a second subset of control resource sets for the second transmission-reception point, each control resource set having an associated default beam and where the first subset of control resource sets and the second subset of control resource sets are non-overlapping. In some cases, the first default beam is determined based on the first subset of control resource sets and the second default beam is determined based on the second subset of control resource sets.

The CORESET manager 1230 may identify control resource sets for TRPs. In some cases, a first default beam for the first transmission-reception point is determined based on control resource set of a downlink control channel reception at the UE, and a second default beam is mapped to the first default beam. In some cases, the mapping provides that the second default beam does not correspond to any configured control resource set of the first transmission-reception point.

Figure 13:
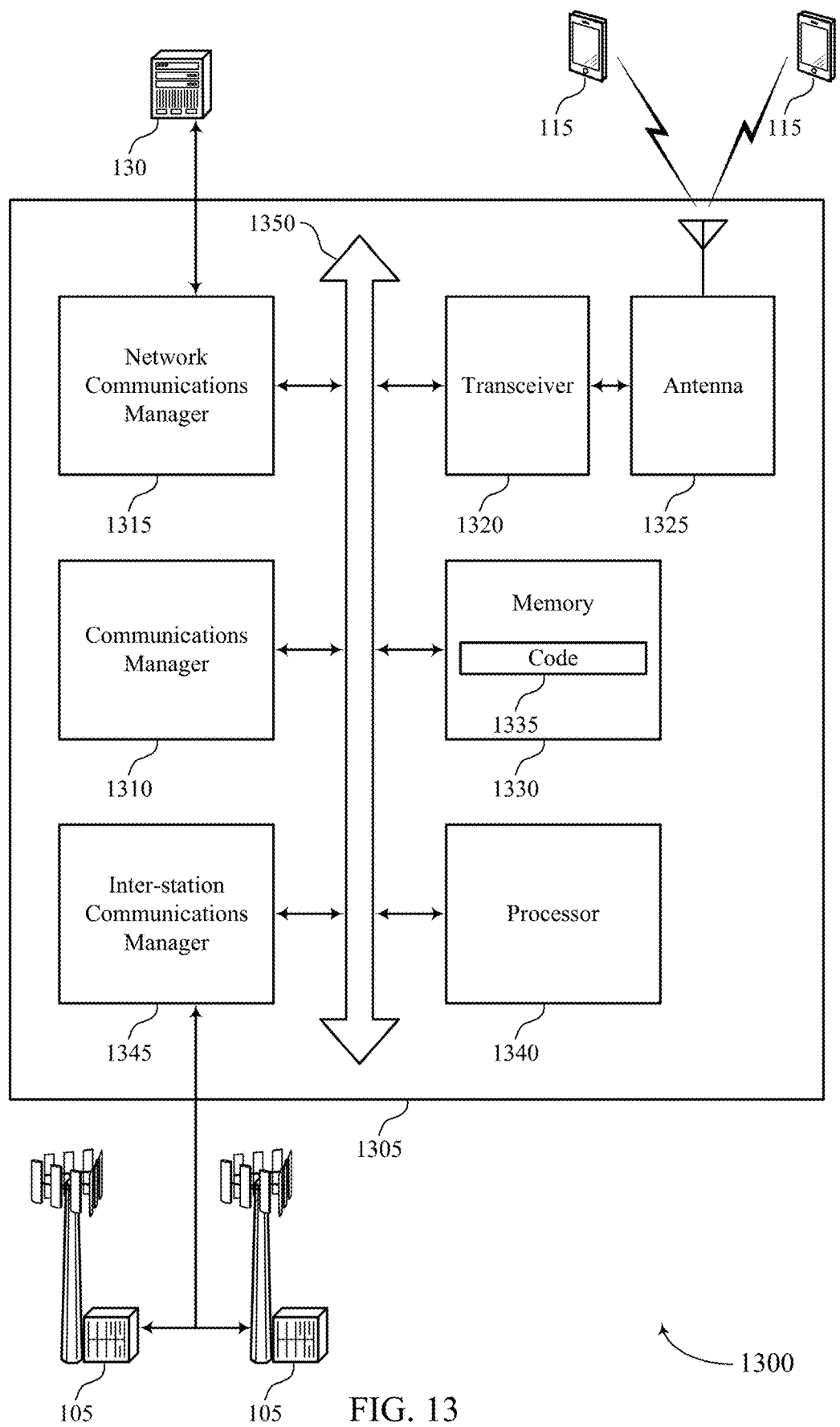
FIG. 13 shows a diagram of a system including a device that supports default transmission beams for multiple transmission-reception points in wireless communications in accordance with aspects of the present disclosure.

FIG. 13 shows a diagram of a system 1300 including a device 1305 that supports default transmission beams for multiple transmission-reception points in wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a first default beam for transmitting a first downlink communication from a first transmission-reception point to a UE and a second default beam for transmitting a second downlink communication from a second transmission-reception point to the UE, determine that the first default beam and the second default beam are incapable of concurrent reception at the UE, and schedule, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE.

The communications manager 1310 may also identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE, determine a first default beam for the first transmission-reception point, select a second default beam for the second transmission-reception point based on the mapping, and schedule, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE.

The communications manager 1310 may also transmit configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE, identify that a time offset between a physical downlink control channel communications and a physical downlink shared channel communications of each of the first transmission-reception point and the second transmission-reception point is below a threshold, and schedule, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting default transmission beams for multiple transmission-reception points in wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
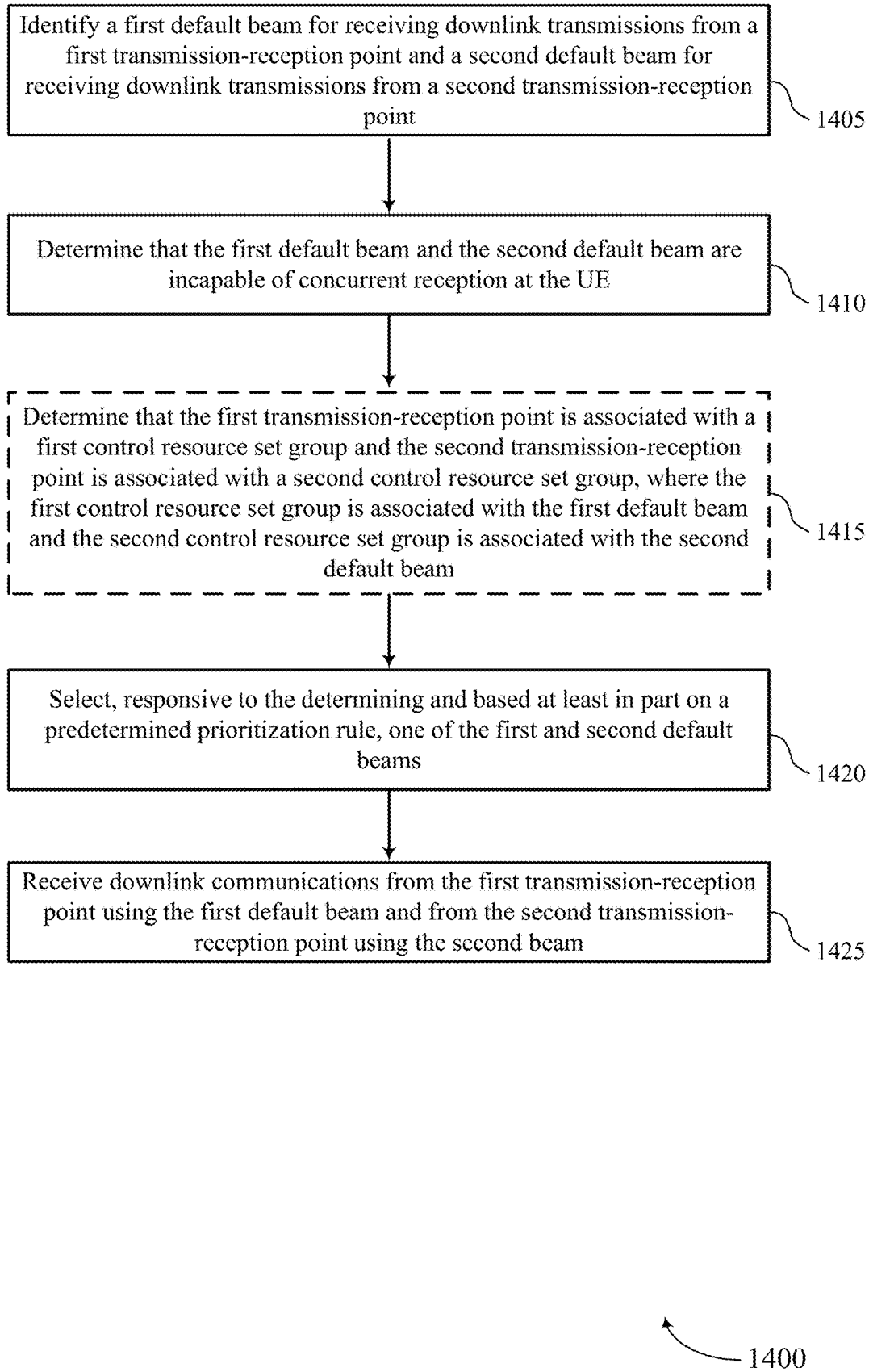
FIGS. 14 through 20 show flowcharts illustrating methods that support default transmission beams for multiple transmission-reception points in wireless communications in accordance with aspects of the present disclosure.

FIG. 14 shows a flowchart illustrating a method 1400 that supports default transmission beams for multiple transmission-reception points in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a first default beam for receiving downlink transmissions from a first transmission-reception point and a second default beam for receiving downlink transmissions from a second transmission-reception point. The operations of 1405 may be performed according to the methods described herein. In some examples, aspects of the operations of 1405 may be performed by a beam management component as described with reference to FIGS. 6 through 9.

At 1410, the UE may determine that the first default beam and the second default beam are incapable of concurrent reception at the UE. The operations of 1410 may be performed according to the methods described herein. In some examples, aspects of the operations of 1410 may be performed by a beam configuration component as described with reference to FIGS. 6 through 9.

Optionally, at 1415, the UE may determine that the first transmission-reception point is associated with a first control resource set group and the second transmission-reception point is associated with a second control resource set group, where the first control resource set group is associated with the first default beam and the second control resource set group is associated with the second default beam. The operations of 1415 may be performed according to the methods described herein. In some examples, aspects of the operations of 1415 may be performed by a default beam manager as described with reference to FIGS. 6 through 9.

At 1420, the UE may select, responsive to the determining and based at least in part on a predetermined prioritization rule, one of the first and second default beams. The operations of 1420 may be performed according to the methods described herein. In some examples, aspects of the operations of 1420 may be performed by a default beam manager as described with reference to FIGS. 6 through 9. In some cases, the predetermined prioritization rule indicates which of the first control resource set group or the second control resource set group has a higher priority.

At 1425, the UE may receive downlink communications from the transmission-reception point associated with the selected default beam. The operations of 1425 may be performed according to the methods described herein. In some examples, aspects of the operations of 1425 may be performed by a buffering component as described with reference to FIGS. 6 through 9.

Figure 15:
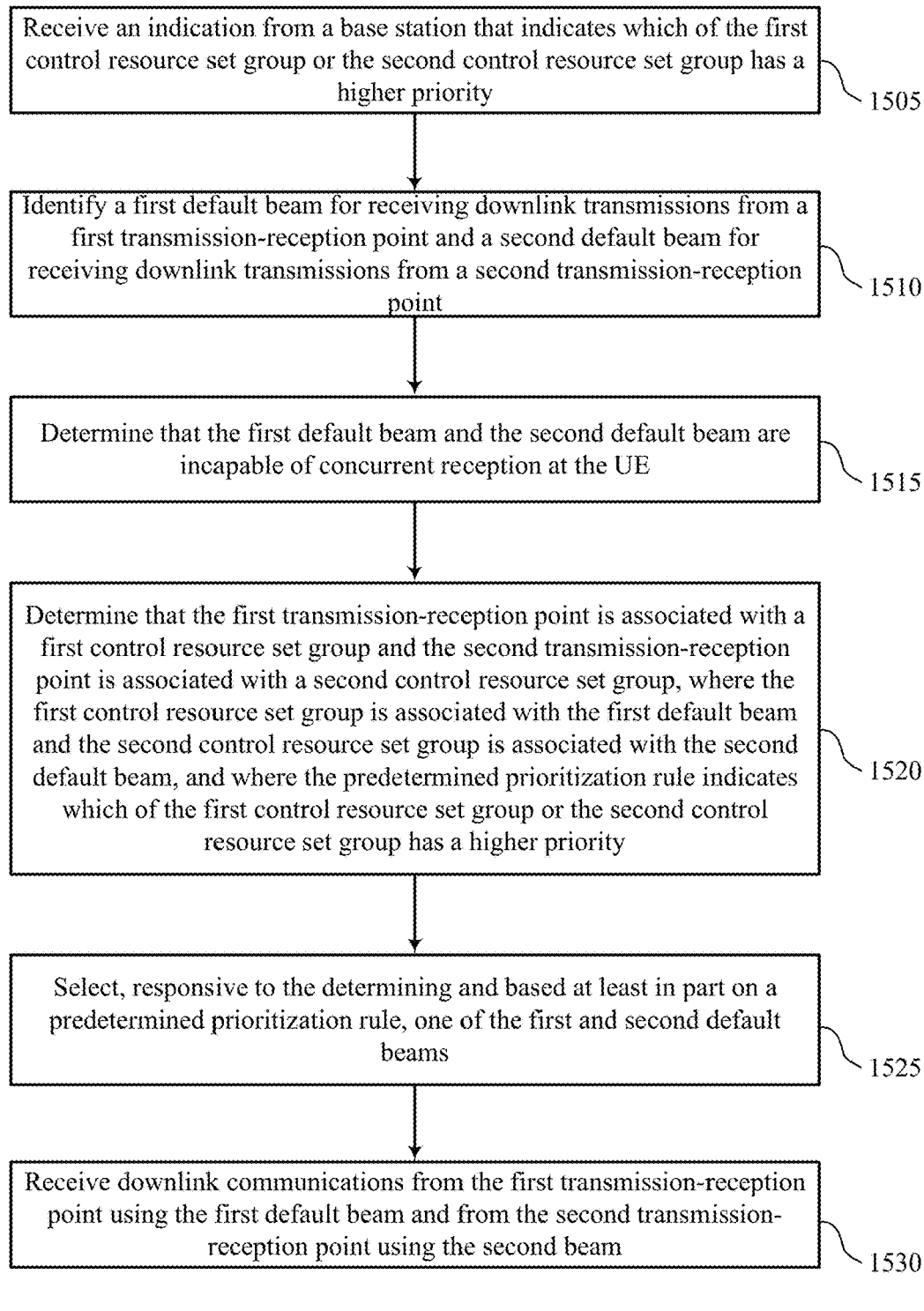

FIG. 15 shows a flowchart illustrating a method 1500 that supports default transmission beams for multiple transmission-reception points in wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive an indication from a base station that indicates which of the first control resource set group or the second control resource set group has a higher priority. The operations of 1505 may be performed according to the methods described herein. In some examples, aspects of the operations of 1505 may be performed by a default beam manager as described with reference to FIGS. 6 through 9. In some cases, the indication from the base station is provided in a RRC transmission, a MAC-CE, in DCI, or any combinations thereof.

At 1510, the UE may identify a first default beam for receiving downlink transmissions from a first transmission-reception point and a second default beam for receiving downlink transmissions from a second transmission-reception point. The operations of 1510 may be performed according to the methods described herein. In some examples, aspects of the operations of 1510 may be performed by a beam management component as described with reference to FIGS. 6 through 9.

At 1515, the UE may determine that the first default beam and the second default beam are incapable of concurrent reception at the UE. The operations of 1515 may be performed according to the methods described herein. In some examples, aspects of the operations of 1515 may be performed by a beam configuration component as described with reference to FIGS. 6 through 9.

At 1520, the UE may determine that the first transmission-reception point is associated with a first control resource set group and the second transmission-reception point is associated with a second control resource set group, where the first control resource set group is associated with the first default beam and the second control resource set group is associated with the second default beam, and where the predetermined prioritization rule indicates which of the first control resource set group or the second control resource set group has a higher priority. The operations of 1520 may be performed according to the methods described herein. In some examples, aspects of the operations of 1520 may be performed by a default beam manager as described with reference to FIGS. 6 through 9.

At 1525, the UE may select, responsive to the determining and based at least in part on a predetermined prioritization rule, one of the first and second default beams. The operations of 1525 may be performed according to the methods described herein. In some examples, aspects of the operations of 1525 may be performed by a default beam manager as described with reference to FIGS. 6 through 9.

At 1530, the UE may receive downlink communications from the transmission-reception point associated with the selected default beam. The operations of 1530 may be performed according to the methods described herein. In some examples, aspects of the operations of 1530 may be performed by a buffering component as described with reference to FIGS. 6 through 9.

Figure 16:
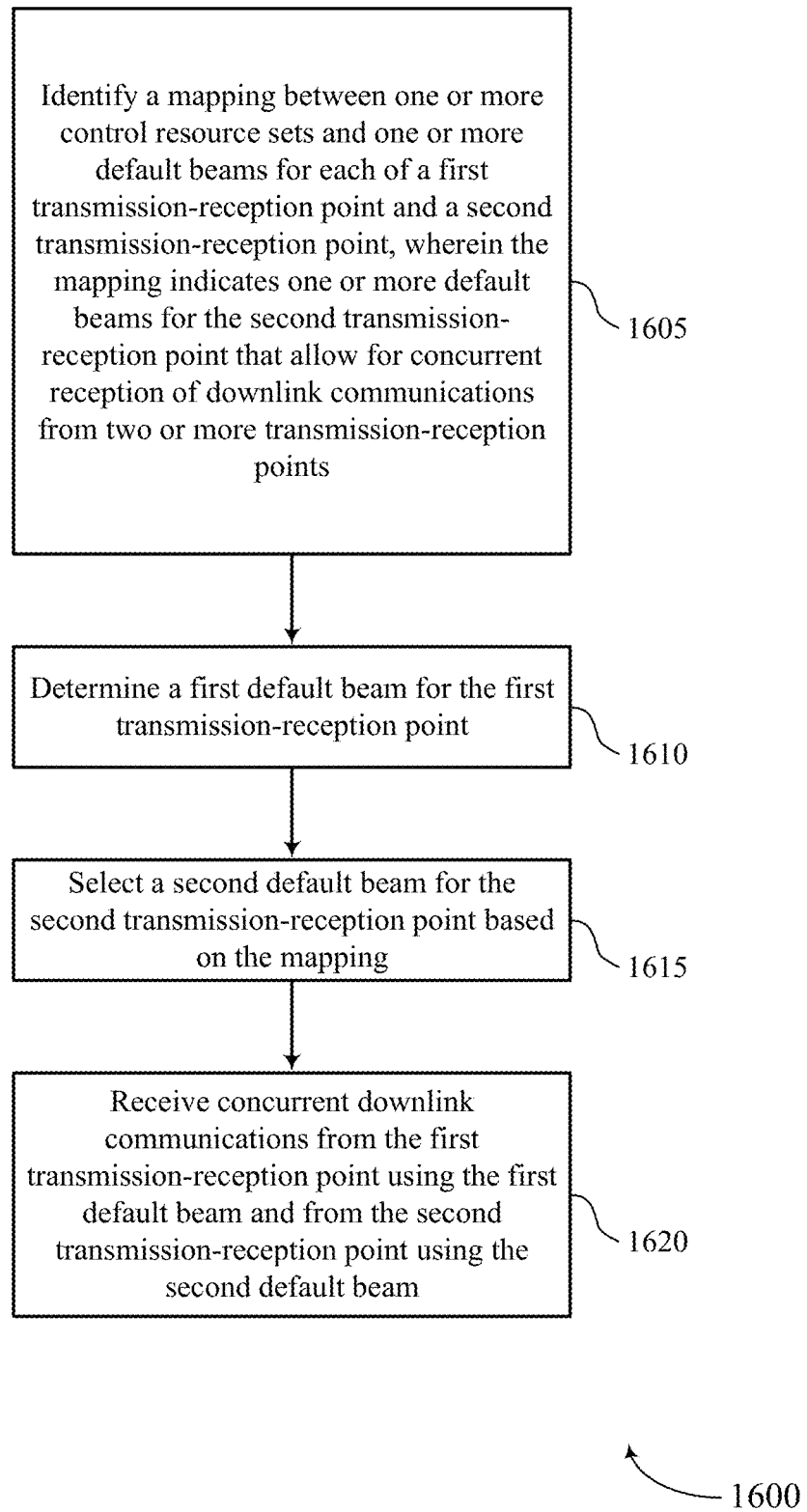

FIG. 16 shows a flowchart illustrating a method 1600 that supports default transmission beams for multiple transmission-reception points in wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points. The operations of 1605 may be performed according to the methods described herein. In some examples, aspects of the operations of 1605 may be performed by a beam mapping manager as described with reference to FIGS. 6 through 9.

At 1610, the UE may determine a first default beam for the first transmission-reception point. The operations of 1610 may be performed according to the methods described herein. In some examples, aspects of the operations of 1610 may be performed by a default beam manager as described with reference to FIGS. 6 through 9.

At 1615, the UE may select a second default beam for the second transmission-reception point based on the mapping. The operations of 1615 may be performed according to the methods described herein. In some examples, aspects of the operations of 1615 may be performed by a default beam manager as described with reference to FIGS. 6 through 9.

At 1620, the UE may receive concurrent downlink communications from the first transmission-reception point using the first default beam and from the second transmission-reception point using the second default beam. The operations of 1620 may be performed according to the methods described herein. In some examples, aspects of the operations of 1620 may be performed by a buffering component as described with reference to FIGS. 6 through 9.

Figure 17:
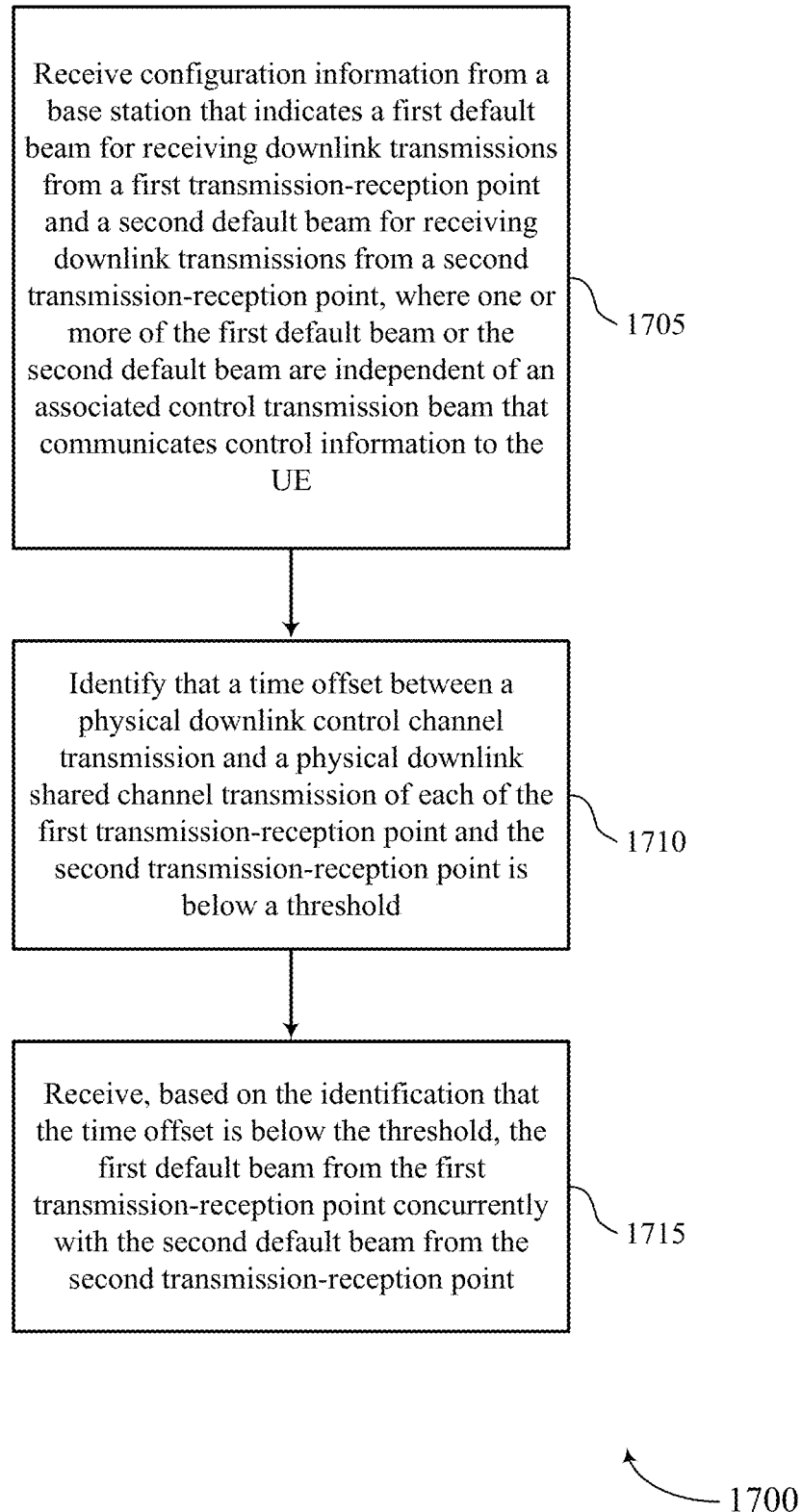

FIG. 17 shows a flowchart illustrating a method 1700 that supports default transmission beams for multiple transmission-reception points in wireless communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive configuration information from a base station that indicates a first default beam for receiving downlink transmissions from a first transmission-reception point and a second default beam for receiving downlink transmissions from a second transmission-reception point, where one or more of the first default beam or the second default beam are independent of an associated control transmission beam that communicates control information to the UE. The operations of 1705 may be performed according to the methods described herein. In some examples, aspects of the operations of 1705 may be performed by a beam configuration component as described with reference to FIGS. 6 through 9.

At 1710, the UE may identify that a time offset between a physical downlink control channel transmission and a physical downlink shared channel transmission of each of the first transmission-reception point and the second transmission-reception point is below a threshold. The operations of 1710 may be performed according to the methods described herein. In some examples, aspects of the operations of 1710 may be performed by a default beam manager as described with reference to FIGS. 6 through 9.

At 1715, the UE may receive, based on the identification that the time offset is below the threshold, the first default beam from the first transmission-reception point concurrently with the second default beam from the second transmission-reception point. The operations of 1715 may be performed according to the methods described herein. In some examples, aspects of the operations of 1715 may be performed by a buffering component as described with reference to FIGS. 6 through 9.

Figure 18:
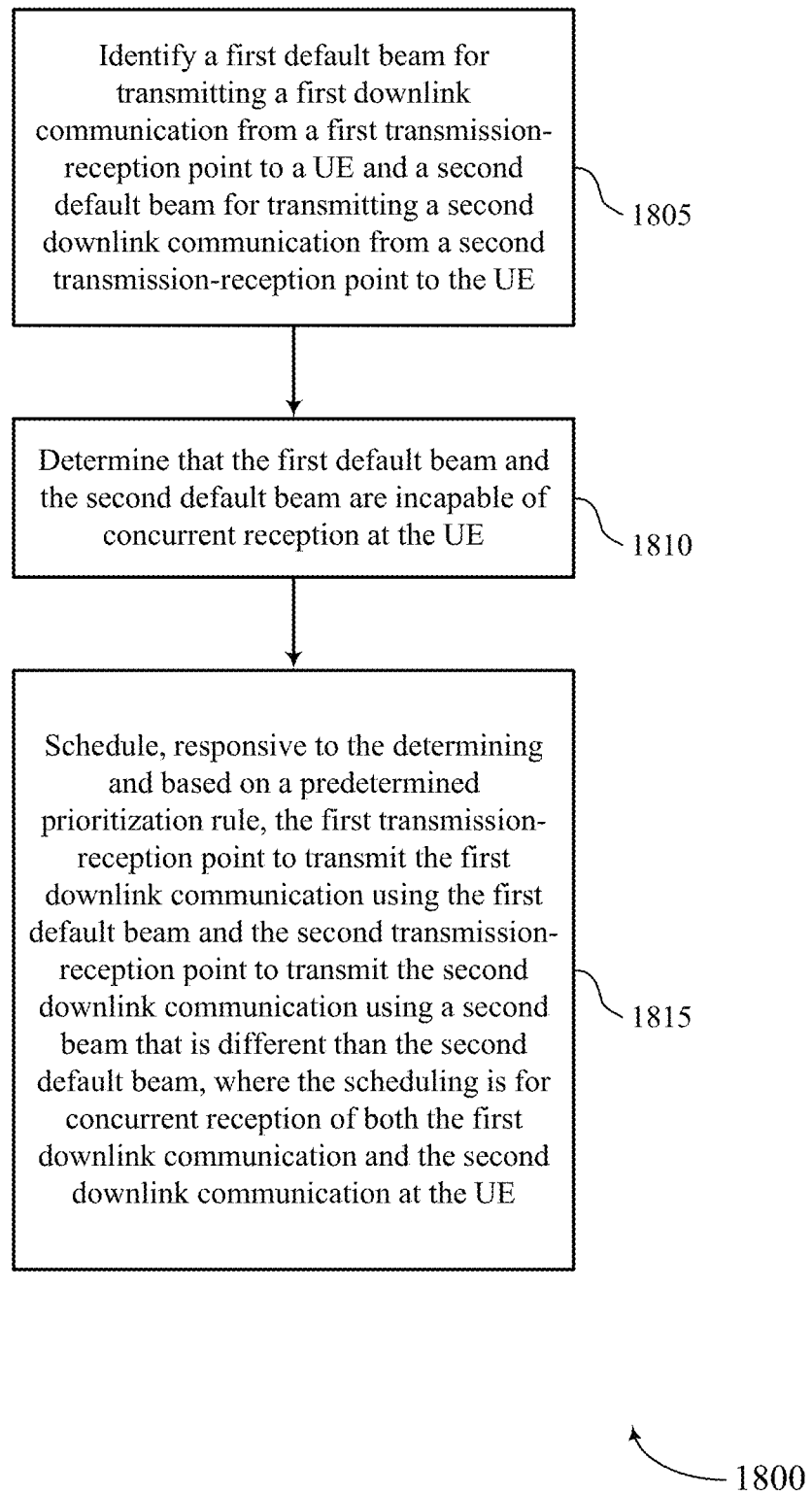

FIG. 18 shows a flowchart illustrating a method 1800 that supports default transmission beams for multiple transmission-reception points in wireless communications in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify a first default beam for transmitting a first downlink communication from a first transmission-reception point to a UE and a second default beam for transmitting a second downlink communication from a second transmission-reception point to the UE. The operations of 1805 may be performed according to the methods described herein. In some examples, aspects of the operations of 1805 may be performed by a beam configuration component as described with reference to FIGS. 10 through 13.

At 1810, the base station may determine that the first default beam and the second default beam are incapable of concurrent reception at the UE. The operations of 1810 may be performed according to the methods described herein. In some examples, aspects of the operations of 1810 may be performed by a default beam manager as described with reference to FIGS. 10 through 13.

At 1815, the base station may schedule, responsive to the determining and based on a predetermined prioritization rule, the first transmission-reception point to transmit the first downlink communication using the first default beam and the second transmission-reception point to transmit the second downlink communication using a second beam that is different than the second default beam, where the scheduling is for concurrent reception of both the first downlink communication and the second downlink communication at the UE. The operations of 1815 may be performed according to the methods described herein. In some examples, aspects of the operations of 1815 may be performed by a beam management component as described with reference to FIGS. 10 through 13.

Figure 19:
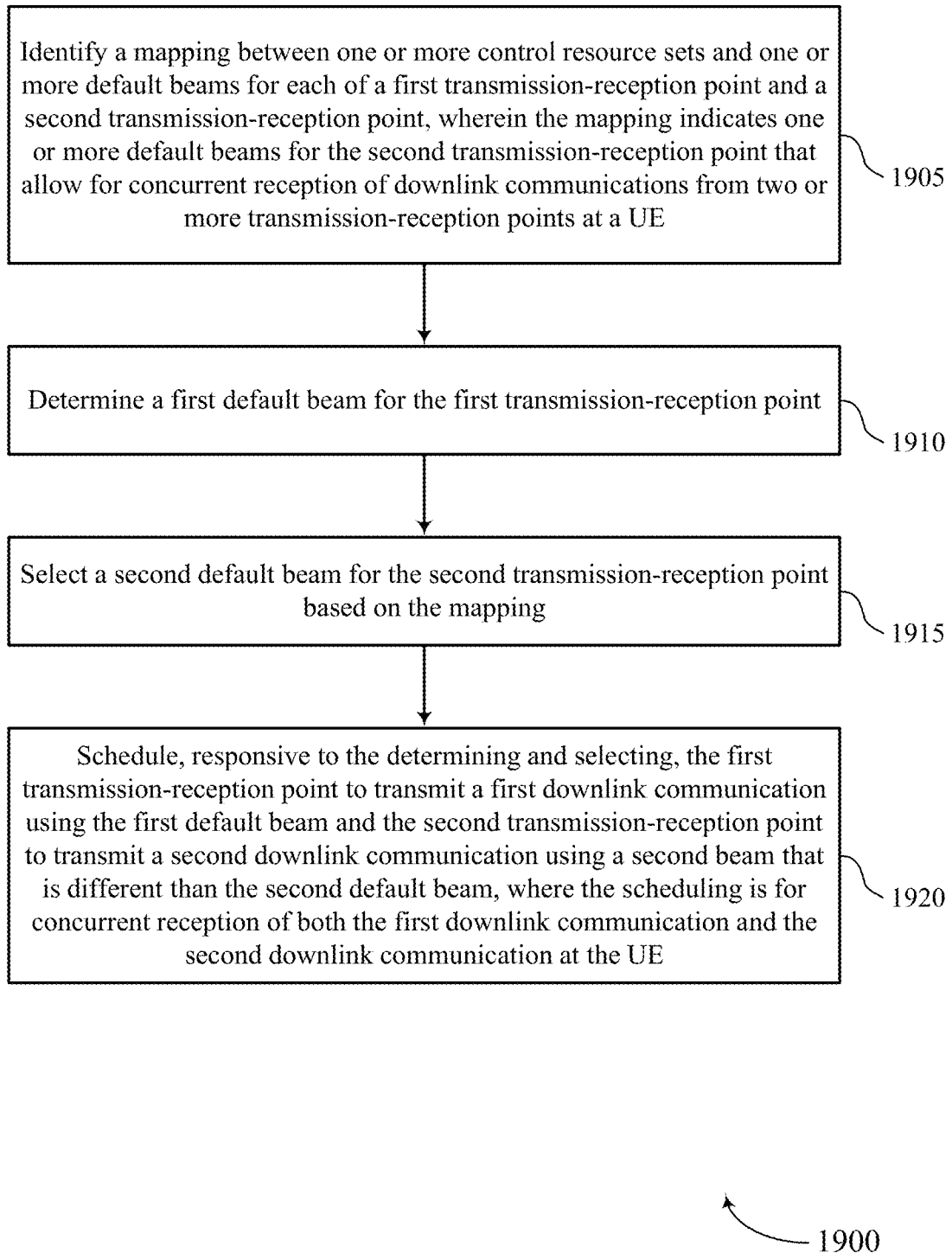

FIG. 19 shows a flowchart illustrating a method 1900 that supports default transmission beams for multiple transmission-reception points in wireless communications in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may identify a mapping between one or more control resource sets and one or more default beams for each of a first transmission-reception point and a second transmission-reception point, wherein the mapping indicates one or more default beams for the second transmission-reception point that allow for concurrent reception of downlink communications from two or more transmission-reception points at a UE. The operations of 1905 may be performed according to the methods described herein. In some examples, aspects of the operations of 1905 may be performed by a beam mapping manager as described with reference to FIGS. 10 through 13.

At 1910, the base station may determine a first default beam for the first transmission-reception point. The operations of 1910 may be performed according to the methods described herein. In some examples, aspects of the operations of 1910 may be performed by a default beam manager as described with reference to FIGS. 10 through 13.

At 1915, the base station may select a second default beam for the second transmission-reception point based on the mapping. The operations of 1915 may be performed according to the methods described herein. In some examples, aspects of the operations of 1915 may be performed by a default beam manager as described with reference to FIGS. 10 through 13.

At 1920, the base station may schedule, responsive to the determining and selecting, the first transmission-reception point to transmit a first downlink communication using the first default beam and the second transmission-reception point to transmit a second downlink communication using a second beam that is different than the second default beam, where the scheduling is for concurrent reception of both the first downlink communication and the second downlink communication at the UE. The operations of 1920 may be performed according to the methods described herein. In some examples, aspects of the operations of 1920 may be performed by a beam management component as described with reference to FIGS. 10 through 13.

Figure 20:
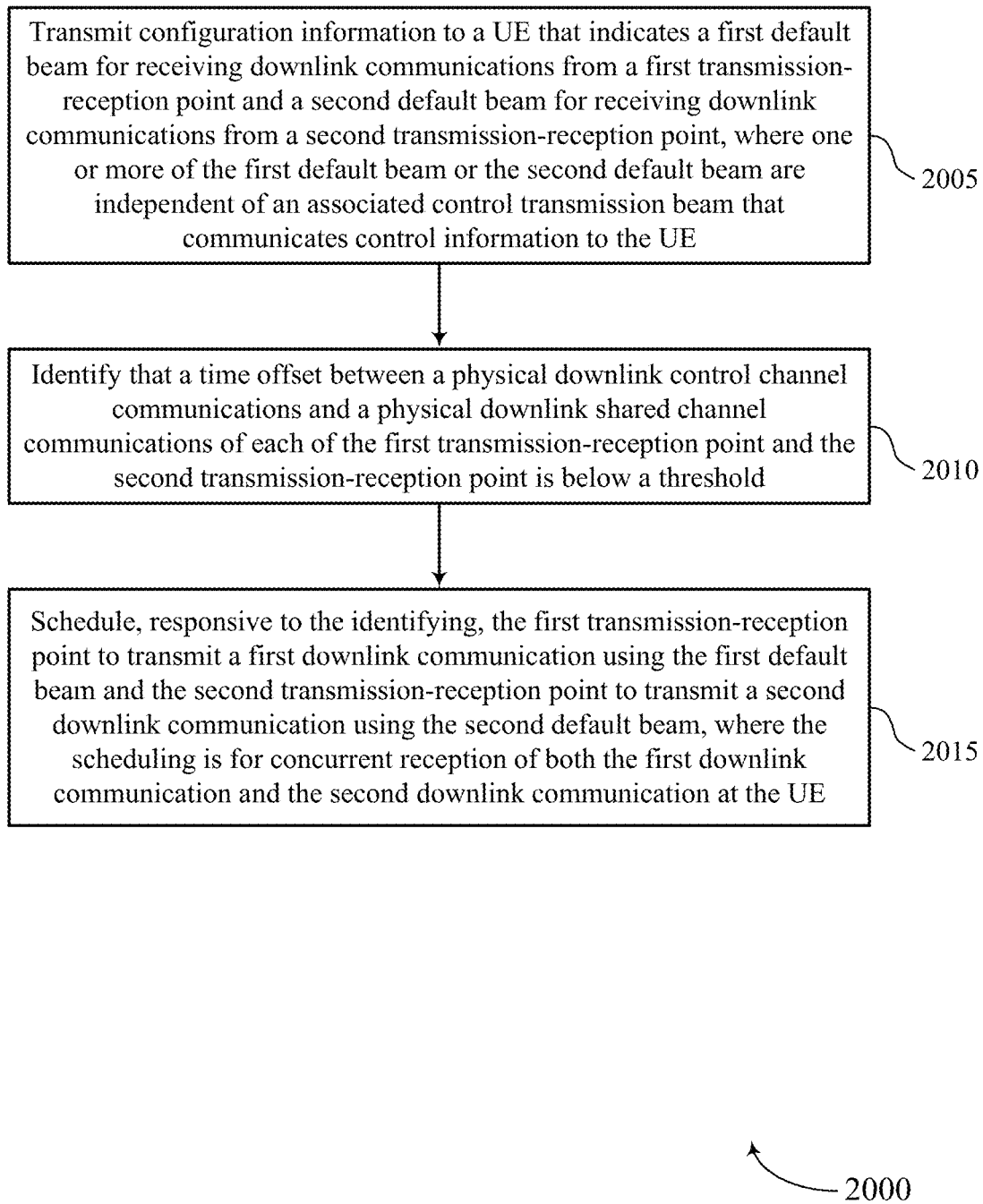

FIG. 20 shows a flowchart illustrating a method 2000 that supports default transmission beams for multiple transmission-reception points in wireless communications in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit configuration information to a UE that indicates a first default beam for receiving downlink communications from a first transmission-reception point and a second default beam for receiving downlink communications from a second transmission-reception point, where one or more of the first default beam or the second default beam are independent of an associated control transmission beam that communicates control information to the UE. The operations of 2005 may be performed according to the methods described herein. In some examples, aspects of the operations of 2005 may be performed by a beam configuration component as described with reference to FIGS. 10 through 13.

At 2010, the base station may identify that a time offset between a physical downlink control channel communications and a physical downlink shared channel communications of each of the first transmission-reception point and the second transmission-reception point is below a threshold. The operations of 2010 may be performed according to the methods described herein. In some examples, aspects of the operations of 2010 may be performed by a default beam manager as described with reference to FIGS. 10 through 13.

At 2015, the base station may schedule, responsive to the identifying, the first transmission-reception point to transmit a first downlink communication using the first default beam and the second transmission-reception point to transmit a second downlink communication using the second default beam, where the scheduling is for concurrent reception of both the first downlink communication and the second downlink communication at the UE. The operations of 2015 may be performed according to the methods described herein. In some examples, aspects of the operations of 2015 may be performed by a beam management component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    a processor;
    memory coupled with the processor; and
    instructions stored in the memory and executable by the processor to cause the apparatus to:
    identify a first default beam for receiving downlink transmissions from a first transmission-reception point and a second default beam for receiving downlink transmissions from a second transmission-reception point;
    determine that the first default beam and the second default beam are incapable of concurrent reception at the UE;
    select, responsive to the determining and based at least in part on a predetermined prioritization rule, one of the first default beam or the second default beam, wherein the predetermined prioritization rule indicates which of two or more default beams that are capable of providing downlink communications is to be selected for the downlink communications; and
    receive downlink communications from the transmission-reception point associated with the selected default beam.

2. The apparatus of claim 1, wherein the instructions are further executable by the processor to cause the apparatus to:
    determine that the first transmission-reception point is associated with a first control resource set group and the second transmission-reception point is associated with a second control resource set group, wherein the first control resource set group is associated with the first default beam and the second control resource set group is associated with the second default beam, and wherein the predetermined prioritization rule indicates which of the first control resource set group or the second control resource set group has a higher priority.

3. The apparatus of claim 2, wherein the predetermined prioritization rule indicates a prespecified priority of the first control resource set group and the second control resource set group.

4. The apparatus of claim 2, wherein the instructions are further executable by the processor to cause the apparatus to:
    receive an indication from an access network entity that indicates which of the first control resource set group or the second control resource set group has the higher priority.

5. The apparatus of claim 4, wherein the indication from the access network entity is provided in a radio resource control transmission, a medium access control (MAC) control element, in downlink control information, or any combinations thereof.

6. The apparatus of claim 2, wherein the instructions are further executable by the processor to cause the apparatus to:
    determine one or more parameters of each of the first control resource set group and the second control resource set group, wherein the predetermined prioritization rule is based at least in part on the determined one or more parameters.

7. The apparatus of claim 6, wherein the one or more parameters include one or more of a number of control resource sets in each of the first control resource set group and the second control resource set group, a search space monitoring period of each of the first control resource set group and the second control resource set group, or any combinations thereof.

8. The apparatus of claim 2, wherein the predetermined prioritization rule indicates a transmission-reception point associated with a handover operation has priority over other transmission-reception points.

9. The apparatus of claim 1, wherein the predetermined prioritization rule provides that priorities for different transmission-reception points can change based on one or more parameters, and wherein the one or more parameters include transmission slots, and wherein the first default beam for the first transmission-reception point is selected for a first subset of transmission slots, and the second default beam for the second transmission-reception point is selected for a second subset of transmission slots.

10. The apparatus of claim 9, wherein the one or more parameters include a value of a control resource set identification associated with each of the first transmission-reception point and the second transmission-reception point, and wherein a lowest valued control resource set identification has a highest priority and the associated default transmission beam is selected for communications with the associated transmission-reception point.

11. The apparatus of claim 1, wherein the instructions are further executable by the processor to cause the apparatus to:
transmit, to a serving access network entity, an incompatible beam report that indicates beams that are not able to be concurrently received at the UE.

12. An apparatus for wireless communication at a user equipment (UE), comprising:
a processor,
memory coupled with the processor; and
instructions stored in the memory and executable by the processor to cause the apparatus to:
identify a mapping between one or more control resource sets and one or more default beams for each of a first transmission-reception point and a second transmission-reception point, wherein the mapping indicates one or more default beams for the second transmission-reception point that are based at least in part on a first default beam of the first transmission-reception point, and that allow for concurrent reception of downlink communications via both the first default beam and one of the one or more default beams for the second transmission-reception point;
determine the first default beam for the first transmission-reception point;
select a second default beam from the one or more default beams for the second transmission-reception point based at least in part on the mapping; and
receive concurrent downlink communications from the first transmission-reception point using the first default beam and from the second transmission-reception point using the second default beam.

13. The apparatus of claim 12, wherein:
the mapping indicates a first subset of control resource sets for the first transmission-reception point and a second subset of control resource sets for the second transmission-reception point, each control resource set having an associated default beam and wherein the first subset of control resource sets and the second subset of control resource sets are non-overlapping; and
the first default beam is determined based at least in part on the first subset of control resource sets and the second default beam is determined based at least in part on the second subset of control resource sets.

14. The apparatus of claim 13, wherein:
any default beam associated with the first subset of control resource sets can be concurrently received at the UE with any default beam associated with the second subset of control resource sets.

15. The apparatus of claim 12, wherein the first default beam for the first transmission-reception point is determined based on a control resource sets of a downlink control channel reception at the UE, and the second default beam is mapped to the first default beam, and wherein the mapping provides that the second default beam does not correspond to any configured control resource set of the first transmission-reception point.

16. An apparatus for wireless communication at an access network entity, comprising:
a processor,
memory coupled with the processor; and
instructions stored in the memory and executable by the processor to cause the apparatus to:
identify a first default beam for transmitting a first downlink communication from a first transmission-reception point to a UE and a second default beam for transmitting a second downlink communication from a second transmission-reception point to the UE;
determine that the first default beam and the second default beam are incapable of concurrent reception at the UE; and
schedule, responsive to the determining and based at least in part on a predetermined prioritization rule, the first transmission-reception point to transmit the first downlink communication using the first default beam and the second transmission-reception point to transmit the second downlink communication using a second beam that is different than the second default beam, wherein the scheduling is for concurrent reception of both the first downlink communication and the second downlink communication at the UE.

17. The apparatus of claim 16, wherein the instructions are further executable by the processor to cause the apparatus to:
determine that the first transmission-reception point is associated with a first control resource set group and the second transmission-reception point is associated with a second control resource set group, wherein the first control resource set group is associated with the first default beam and the second control resource set group is associated with the second default beam, and wherein the predetermined prioritization rule indicates which of the first control resource set group or the second control resource set group has a higher priority.

18. The apparatus of claim 17, wherein the predetermined prioritization rule indicates a prespecified priority of the first control resource set group and the second control resource set group.

19. The apparatus of claim 17, wherein the instructions are further executable by the processor to cause the apparatus to:
transmit an indication to the UE that indicates which of the first control resource set group or the second control resource set group has the higher priority.

20. The apparatus of claim 17, wherein the instructions are further executable by the processor to cause the apparatus to:
determine one or more parameters of each of the first control resource set group and the second control resource set group, wherein the predetermined prioritization rule is based at least in part on the determined one or more parameters, and
wherein the one or more parameters include one or more of a number of control resource sets in each of the first control resource set group and the second control resource set group, a search space monitoring period of each of the first control resource set group and the second control resource set group, or any combinations thereof.

21. The apparatus of claim 16, wherein the predetermined prioritization rule provides that priorities for different transmission-reception points can change based on one or more parameters, and wherein the one or more parameters include transmission slots, and wherein the first default beam for the first transmission-reception point is selected for a first subset of transmission slots, and the second default beam for the second transmission-reception point is selected for a second subset of transmission slots.

22. An apparatus for wireless communication at an access network entity, comprising:
a processor,
memory coupled with the processor; and instructions stored in the memory and executable by the processor to cause the apparatus to:
identify a mapping between one or more control resource sets and one or more default beams for each of a first transmission-reception point and a second transmission-reception point, wherein the mapping indicates one or more default beams for the second transmission-reception point that are based at least in part on a first default beam of the first transmission-reception point, and that allow for concurrent reception of downlink communications via both the first default beam and one of the one or more default beams for the second transmission-reception point at a UE;
determine the first default beam for the first transmission-reception point;
select a second default beam from the one or more default beams for the second transmission-reception point based at least in part on the mapping; and
schedule, responsive to the determining and selecting, the first transmission-reception point to transmit a first downlink communication using the first default beam and the second transmission-reception point to transmit a second downlink communication using the second default beam, wherein the scheduling is for concurrent reception of both the first downlink communication and the second downlink communication at the UE.

23. The apparatus of claim 22, wherein:
the mapping indicates a first subset of control resource sets for the first transmission-reception point and a second subset of control resource sets for the second transmission-reception point, each control resource set having an associated default beam and wherein the first subset of control resource sets and the second subset of control resource sets are non-overlapping; and
the first default beam is determined based at least in part on the first subset of control resource sets and the second default beam is determined based at least in part on the second subset of control resource sets.

24. The apparatus of claim 23, wherein:
any default beam associated with the first subset of control resource sets can be concurrently received at the UE with any default beam associated with the second subset of control resource sets.

25. The apparatus of claim 22, wherein the first default beam for the first transmission-reception point is determined based on a control resource set of a downlink control channel reception at the UE, and the second default beam is mapped to the first default beam.

26. A method for wireless communication at a user equipment (UE), comprising:
identifying a first default beam for receiving downlink transmissions from a first transmission-reception point and a second default beam for receiving downlink transmissions from a second transmission-reception point;
determining that the first default beam and the second default beam are incapable of concurrent reception at the UE;
selecting, responsive to the determining and based at least in part on a predetermined prioritization rule, one of the first default beam or the second default beam, wherein the predetermined prioritization rule indicates which of two or more default beams that are capable of providing downlink communications is to be selected for the downlink communications; and
receiving downlink communications from the transmission-reception point associated with the selected default beam.

27. The method of claim 26, further comprising:
determining that the first transmission-reception point is associated with a first control resource set group and the second transmission-reception point is associated with a second control resource set group, wherein the first control resource set group is associated with the first default beam and the second control resource set group is associated with the second default beam, and wherein the predetermined prioritization rule indicates which of the first control resource set group or the second control resource set group has a higher priority, wherein the predetermined prioritization rule indicates a prespecified priority of the first control resource set group and the second control resource set group.

28. The method of claim 27, further comprising:
receiving an indication from an access network entity that indicates which of the first control resource set group or the second control resource set group has the higher priority, wherein the indication from the access network entity is provided in a radio resource control transmission, a medium access control (MAC) control element, in downlink control information, or any combinations thereof.

29. The method of claim 27, further comprising:
determining one or more parameters of each of the first control resource set group and the second control resource set group, wherein the predetermined prioritization rule is based at least in part on the determined one or more parameters, wherein the one or more parameters include one or more of a number of control resource sets in each of the first control resource set group and the second control resource set group, a search space monitoring period of each of the first control resource set group and the second control resource set group, or any combinations thereof.

30. The method of claim 26, wherein the predetermined prioritization rule provides that priorities for different transmission-reception points can change based on one or more parameters, and wherein the one or more parameters include transmission slots, and wherein the first default beam for the first transmission-reception point is selected for a first subset of transmission slots, and the second default beam for the second transmission-reception point is selected for a second subset of transmission slots.

31. The method of claim 30, wherein the one or more parameters include a value of a control resource set identification associated with each of the first transmission-reception point and the second transmission-reception point, and wherein a lowest valued control resource set identification has a highest priority and the associated default transmission beam is selected for communications with the associated transmission-reception point.

32. The method of claim 26, further comprising:
transmitting, to a serving access network entity, an incompatible beam report that indicates beams that are not able to be concurrently received at the UE.

33. A method for wireless communication at a user equipment (UE), comprising:
identifying a mapping between one or more control resource sets and one or more default beams for each of a first transmission-reception point and a second transmission-reception point, wherein the mapping indicates one or more default beams for the second transmission-reception point that are based at least in part on a first default beam of the first transmission-reception point, and that allow for concurrent reception of downlink communications via both the first default beam and one of the one or more default beams for the second transmission-reception point;

determining the first default beam for the first transmission-reception point;

selecting a second default beam from the one or more default beams for the second transmission-reception point based at least in part on the mapping; and receiving concurrent downlink communications from the first transmission-reception point using the first default beam and from the second transmission-reception point using the second default beam.

34. The method of claim 33, wherein:

the mapping indicates a first subset of control resource sets for the first transmission-reception point and a second subset of control resource sets for the second transmission-reception point, each control resource set having an associated default beam and wherein the first subset of control resource sets and the second subset of control resource sets are non-overlapping;

the first default beam is determined based at least in part on the first subset of control resource sets and the second default beam is determined based at least in part on the second subset of control resource sets, and wherein any default beam associated with the first subset of control resource sets can be concurrently received at the UE with any default beam associated with the second subset of control resource sets.

35. The method of claim 33, wherein the first default beam for the first transmission-reception point is determined based on a control resource sets of a downlink control channel reception at the UE, and the second default beam is mapped to the first default beam, and the mapping provides that the second default beam does not correspond to any configured control resource set of the first transmission-reception point.

36. A method for wireless communication at an access network entity, comprising:

identifying a first default beam for transmitting a first downlink communication from a first transmission-reception point to a UE and a second default beam for transmitting a second downlink communication from a second transmission-reception point to the UE;

determining that the first default beam and the second default beam are incapable of concurrent reception at the UE; and scheduling, responsive to the determining and based at least in part on a predetermined prioritization rule, the first transmission-reception point to transmit the first downlink communication using the first default beam and the second transmission-reception point to transmit the second downlink communication using a second beam that is different than the second default beam, wherein the scheduling is for concurrent reception of both the first downlink communication and the second downlink communication at the UE.

37. The method of claim 36, further comprising:

determining that the first transmission-reception point is associated with a first control resource set group and the second transmission-reception point is associated with a second control resource set group, wherein the first control resource set group is associated with the first default beam and the second control resource set group is associated with the second default beam, and wherein the predetermined prioritization rule indicates which of the first control resource set group or the second control resource set group has a higher priority; and transmitting an indication to the UE that indicates which of the first control resource set group or the second control resource set group has the higher priority.

38. The method of claim 37, further comprising:

determining one or more parameters of each of the first control resource set group and the second control resource set group, wherein the predetermined prioritization rule is based at least in part on the determined one or more parameters, wherein the one or more parameters include one or more of a number of control resource sets in each of the first control resource set group and the second control resource set group, a search space monitoring period of each of the first control resource set group and the second control resource set group, or any combinations thereof.

39. The method of claim 36, wherein the predetermined prioritization rule provides that priorities for different transmission-reception points can change based on one or more parameters, and wherein the one or more parameters include transmission slots, and wherein the first default beam for the first transmission-reception point is selected for a first subset of transmission slots, and the second default beam for the second transmission-reception point is selected for a second subset of transmission slots.

40. A method for wireless communication at an access network entity, comprising:

identifying a mapping between one or more control resource sets and one or more default beams for each of a first transmission-reception point and a second transmission-reception point, wherein the mapping indicates one or more default beams for the second transmission-reception point that are based at least in part on a first default beam of the first transmission-reception point, and that allow for concurrent reception of downlink communications via both the first default beam and one of the one or more default beams for the second transmission-reception point at a UE;

determining the first default beam for the first transmission-reception point;

selecting a second default beam from the one or more default beams for the second transmission-reception point based at least in part on the mapping; and scheduling, responsive to the determining and selecting, the first transmission-reception point to transmit a first downlink communication using the first default beam and the second transmission-reception point to transmit a second downlink communication using the second default beam, wherein the scheduling is for concurrent reception of both the first downlink communication and the second downlink communication at the UE.

41. The method of claim 40, wherein:

the mapping indicates a first subset of control resource sets for the first transmission-reception point and a second subset of control resource sets for the second transmission-reception point, each control resource set having an associated default beam and wherein the first subset of control resource sets and the second subset of control resource sets are non-overlapping; and the first default beam is determined based at least in part on the first subset of control resource sets and the second default beam is determined based at least in part on the second subset of control resource sets.

42. The method of claim 40, wherein the first default beam for the first transmission-reception point is determined based on a control resource set of a downlink control channel reception at the UE, and the second default beam is mapped to the first default beam.

\* \* \* \* \*